United States Patent
Choi et al.

(10) Patent No.: US 11,770,226 B2
(45) Date of Patent: *Sep. 26, 2023

(54) METHOD FOR TRANSMITTING AND RECEIVING SOUNDING REFERENCE SIGNAL IN WIRELESS COMMUNICATION SYSTEM AND DEVICE THEREFOR

(71) Applicant: LG ELECTRONICS INC., Seoul (KR)

(72) Inventors: Kukheon Choi, Seoul (KR); Kunil Yum, Seoul (KR); Jiwon Kang, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,016

(22) Filed: Nov. 7, 2022

(65) Prior Publication Data

US 2023/0060652 A1  Mar. 2, 2023

Related U.S. Application Data

(63) Continuation of application No. 17/224,800, filed on Apr. 7, 2021, now Pat. No. 11,496,261, which is a
(Continued)

(30) Foreign Application Priority Data

Apr. 5, 2018 (KR) .................. 10-2018-0039966

(51) Int. Cl.
  *H04L 5/00* (2006.01)
  *H04W 72/21* (2023.01)
  *H04W 72/56* (2023.01)

(52) U.S. Cl.
  CPC .......... *H04L 5/0048* (2013.01); *H04W 72/21* (2023.01); *H04W 72/56* (2023.01)

(58) Field of Classification Search
None
See application file for complete search history.

(56) References Cited

U.S. PATENT DOCUMENTS 9,258,092 B2   2/2016  Heo et al.
9,756,616 B2   9/2017  Noh
(Continued)

FOREIGN PATENT DOCUMENTS

JP        2016506199       2/2016
KR        20130132767      12/2013
WO        WO 2017223196    12/2017

OTHER PUBLICATIONS

CN Office Action in Chinese Appln. No. 201980004987.5, dated Feb. 5, 2021, 13 pages (with English translation).
(Continued)

*Primary Examiner* — Shripal K Khajuria
(74) *Attorney, Agent, or Firm* — Fish & Richardson P.C.

(57) ABSTRACT

Systems and techniques or transmitting and receiving a sounding reference signal (SRS) in a wireless communication system. In some implementations, a method for transmitting, by a terminal, an SRS in a wireless communication system includes: receiving configuration information for transmission of the SRS from a base station; and transmitting the SRS to the base station by using one or more SRS resources for transmission of the SRS, the configuration information including the one or more SRS resources and information relating to usage of the one or more SRS resources, wherein a guard period relating to the one or more SRS resources is configured, and when the transmissions of the guard period and a particular uplink channel configured for the terminal overlap each other, the priority between the guard period and the particular uplink channel is configured to be the same as that between the SRS and the particular uplink channel.

19 Claims, 18 Drawing Sheets

Related U.S. Application Data continuation of application No. 16/756,260, filed as application No. PCT/KR2029/002158 on Feb. 21, 2019, now Pat. No. 11,018,822.

(60) Provisional application No. 62/633,083, filed on Feb. 21, 2018, provisional application No. 62/633,513, filed on Feb. 21, 2018.

(56) References Cited

U.S. PATENT DOCUMENTS

| | | | |
|---|---|---|---|
| 10,154,497 | B2 | 12/2018 | Noh |
| 10,666,408 | B2 | 5/2020 | Shin et al. |
| 11,018,822 | B2 * | 5/2021 | Choi .................... H04W 72/56 |
| 11,496,261 | B2 * | 11/2022 | Choi .................... H04W 72/56 |
| 2011/0249581 | A1 | 10/2011 | Jen |
| 2013/0039233 | A1 * | 2/2013 | Dai ...................... H04W 24/10 370/280 |
| 2015/0023145 | A1 | 1/2015 | Kim et al. |
| 2015/0031410 | A1 | 1/2015 | Lim et al. |
| 2016/0381490 | A1 | 12/2016 | Rico Alvarino et al. |
| 2017/0048717 | A1 | 2/2017 | Yoo et al. |
| 2017/0272299 | A1 | 9/2017 | Chae et al. |
| 2017/0302419 | A1 * | 10/2017 | Liu ...................... H04L 5/0082 |
| 2018/0007667 | A1 * | 1/2018 | You ...................... H04L 5/0051 |
| 2020/0037265 | A1 | 1/2020 | Akkarakaran et al. |

OTHER PUBLICATIONS

EP Extended European Search Report in European Appln. No. 19757518.6, dated Dec. 4, 2020, 13 pages.

Ericsson et al., "WF on SRS for NR," RI-1718968, 3GPP TSG RAN WG1 Meeting #90b, Prague, Czech Republic, dated Oct. 9-13, 2017, 15 pages.

Huawei et al., "WF on the retuning of SRS transmission," R1-1704046, 3GPP TSG-RAN WG1 Meeting #88, Athens, Greece, dated Feb. 13-17, 2017, 5 pages.

Huawei, HiSilicon, "Antenna selection transmission for PUSCH," R1-1801810, 3GPP TSG RAN WG1 Meeting #92, Athens, Greece, dated Feb. 26-Mar. 2, 2018, 6 pages.

Huawei, HiSilicon, "Summary of remaining details of SRS design," R1-1800090, 3GPP TSG RAN WG1 Ad Hoc Meeting, Vancouver, Canada, dated Jan. 22-23, 2018, 14 pages.

JP Office Action in Japanese Appln. No. 2020-519783, dated Nov. 10, 2020, 6 pages (with English translation).

KR Notice of Allowance in Korean Appln. No. 10-2020-7003 801, dated Sep. 3, 2020, 4 pages (with English translation).

LTE, "Evolved Universal Terrestrial Radio Access (E-UTRA); Physical layer procedures (3GPP TS 36.213 version 14.5.0 Release 14)," ETSI TS 136 213 V14.5.0, dated Jan. 2018, 464 pages.

Samsung, "Issues on SRS," R1-1801971, 3GPP TSG RAN WG1 Meeting #92, Athens, Greece, dated Feb. 26-Mar. 2, 2018, 4 pages.

Sony, "Summary of SRS," R1-1801005, 3GPP TSG RAN WG1 Ad Hoc-1801 Meeting, Vancouver, CA, dated Jan. 22-26, 2018, 40 pages.

Vivo, "Remaining issues and text proposals on SRS design," R1-1800192, 3GPP TSG RAN WG1 Meeting AH 1801, Vancouver, Canada, dated Jan. 22-26, 2018, 7 pages.

Vivo, "Remaining on SRS design," R1-1801527, 3GPP TSG RAN WG1 Meeting #92, Athens, Greece, dated Feb. 26-Mar. 2, 2018, 4 pages.

ZTE, Sanechips, "Discussion on SRS design for NR," R1-1715451, 3GPP TSG RAN WG1 Meeting NR#3, Nagoya, Japan, dated Sep. 18-21, 2017, 7 pages.

ZTE, Sanechips, "Discussion on SRS design for NR," R1-1717435, 3GPP TSG RAN WG1 Meeting 90bis, Prague, CZ, dated Oct. 9-13, 2017, 9 pages.

ZTE, Sanechips, "Remaining details on SRS," R1-1801588, 3GPP TSG RAN WG1 Meeting #92, Athens, Greece, dated Feb. 26-Mar. 2, 2018, 8 pages.

\* cited by examiner

▨ :SRS resource

METHOD FOR TRANSMITTING AND RECEIVING SOUNDING REFERENCE SIGNAL IN WIRELESS COMMUNICATION SYSTEM AND DEVICE THEREFOR

CROSS-REFERENCE TO RELATED APPLICATIONS

This application is a continuation of U.S. application Ser. No. 17/224,800, filed on Apr. 7, 2021, which is a continuation of U.S. application Ser. No. 16/756,260, filed on Apr. 15, 2020, which is the National Stage Filing under 35 U.S.C. 371 of International Application No. PCT/KR2019/002158, filed on Feb. 21, 2019, which claims the benefit of U.S. Provisional Application No. 62/633,083, filed on Feb. 21, 2018, U.S. Provisional Application No. 62/633,513, filed on Feb. 21, 2018 and KR Application No. 10-2018-0039966, filed on Apr. 5, 2018. The contents of these prior applications are hereby incorporated by reference in their entirety.

TECHNICAL FIELD

The disclosure relates to a wireless communication system, and more specifically, to a method for communicating a sounding reference signal and a device for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DETAILED DESCRIPTION OF THE DISCLOSURE

The disclosure proposes a method of transmitting/receiving a sounding reference signal (SRS) in a wireless communication system.

Specifically, the disclosure proposes a method of setting and/or indicating a guard period for the SRS transmission/reception.

In particular, there is proposed a method of setting and/or indicating a guard period considering SRS transmission/reception and other uplink transmission (e.g., physical uplink control channel (PUCCH) or physical uplink shared channel (PUSCH)).

Technical objects to be achieved in the present disclosure are not limited to the above-described technical objects, and other technical objects not described above may be evidently understood by a person having ordinary skill in the art to which the present disclosure pertains from the following description.

According to an embodiment of the disclosure, a method of performing a transmission of a sounding reference signal (SRS) by a user equipment (UE) in a wireless communication system comprises receiving, from a base station (BS), configuration information for the transmission of the SRS, wherein the configuration information includes one or more SRS resources for the transmission of the SRS and information for an usage of the one or more SRS resources, and performing the transmission of the SRS to the BS, using the one or more SRS resources, wherein a guard period related to the one or more SRS resources is configured, and wherein, when the guard period is overlapped with a transmission of a specific uplink channel configured to the UE, a priority between the guard period and the specific uplink channel is identically configured to a priority between the SRS and the specific uplink channel.

Further, according to an embodiment of the disclosure, in the method, when the usage is configured to an antenna switching, the guard period may be configured for the antenna switching.

Further, according to an embodiment of the disclosure, in the method, the specific uplink channel may be a physical uplink control channel (PUCCH) for a channel state information (CSI) reporting or a beam failure recovery.

Further, according to an embodiment of the disclosure, in the method, when the PUCCH is configured for the beam failure recovery, a guard period and a SRS resource overlapped with the PUCCH may be dropped.

Further, according to an embodiment of the disclosure, in the method, the number of symbols of the guard period may be configured by considering a subcarrier spacing which is configured for the transmission of the SRS.

Further, according to an embodiment of the disclosure, in the method, the number of symbols of the guard period may be one or two.

Further, according to an embodiment of the disclosure, in the method, configuration information for the guard period may be configured for each of SRS resource sets, via a higher layer signaling.

Further, according to an embodiment of the disclosure, in the method, the configuration information for the guard period may include a starting position index of the guard period, the number of symbols of the guard period, and/or information for whether the guard period is configured between the transmission of the SRS and a transmission of another uplink channel adjacent thereto.

Further, according to an embodiment of the disclosure, in the method, when the guard period is not configured, the UE may be configured to perform an uplink transmission prior to the guard period and an uplink transmission after the guard period, using a same transmission beam.

Further, according to an embodiment of the disclosure, in the method, the same transmission beam may be indicated by a SRS resource indicator (SRI) and/or a transmit precoder matrix indicator (TPMI).

According to an embodiment of the disclosure, a user equipment (UE) of performing a transmission of a sounding reference signal (SRS) in a wireless communication system comprises a radio frequency (RF) unit for transmitting and receiving a radio signal, and a processor operatively coupled to the RF unit, wherein the processor may be configured to control to receive, from a base station (BS), configuration information for the transmission of the SRS and perform the transmission of the SRS to the BS, using the one or more SRS resources, wherein the configuration information may include one or more SRS resources for the transmission of the SRS and information for an usage of the one or more SRS resources, wherein a guard period related to the one or more SRS resources may be configured, and wherein, when the guard period is overlapped with a transmission of a specific uplink channel configured to the UE, a priority between the guard period and the specific uplink channel may be identically configured to a priority between the SRS and the specific uplink channel.

Further, according to an embodiment of the disclosure, in the UE, when the usage is configured to an antenna switching, the guard period may be configured for the antenna switching.

Further, according to an embodiment of the disclosure, in the UE the specific uplink channel may be a physical uplink control channel (PUCCH) for a channel state information (CSI) reporting or a beam failure recovery.

Further, according to an embodiment of the disclosure, in the UE the number of symbols of the guard period may be configured by considering a subcarrier spacing which is configured for the transmission of the SRS.

According to an embodiment of the disclosure, a base station of performing reception of a sounding reference signal (SRS) in a wireless communication system comprises a radio frequency (RF) unit for transmitting and receiving a radio signal, and a processor operatively coupled to the RF unit, wherein the processor may be configured to control to transmit, to a base station (BS), configuration information for the transmission of the SRS and perform the reception of the SRS from the BS, using the one or more SRS resources, wherein the configuration information may include one or more SRS resources for the transmission of the SRS and information for an usage of the one or more SRS resources, wherein a guard period related to the one or more SRS resources may be configured, and wherein, when the guard period is overlapped with a transmission of a specific uplink channel configured to the UE, a priority between the guard period and the specific uplink channel may be identically configured to a priority between the SRS and the specific uplink channel.

According to an embodiment of the disclosure, although SRS transmission/reception to which antenna switching applies and other uplink transmission are performed adjacent to each other, the UE may perform efficient uplink transmission via the guard period.

Further, according to an embodiment of the disclosure, the configuration of the guard period and the priority may prevent distortion of uplink transmission due to collision between the SRS resources.

Effects which may be obtained in the present disclosure are not limited to the above-described effects, and other technical effects not described above may be evidently understood by a person having ordinary skill in the art to which the present disclosure pertains from the following description.

BRIEF DESCRIPTION OF DRAWINGS

The accompanying drawings, which are included herein as a part of a description in order to help understanding of the present disclosure, provide embodiments of the present disclosure, and describe the technical features of the present disclosure with the description below.

MODE FOR CARRYING OUT THE DISCLOSURE

Figure 1:
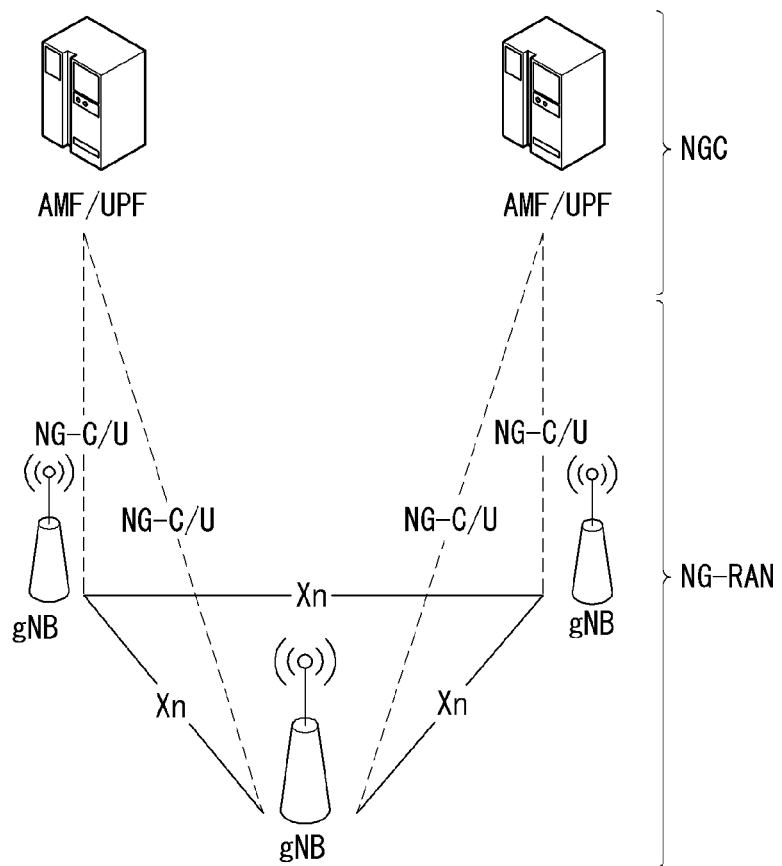
FIG. 1 is a diagram illustrating an example of an overall structure of a new radio (NR) system to which a method proposed by the present disclosure may be implemented.

Hereinafter, some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical spirit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT (NR) is chiefly described, but the technical characteristics of the present disclosure are not limited thereto.

As propagation of smart phones and Internet of things (IoT) terminals rapidly spreads, the amount of information which is transmitted and received through a communication network increase. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this disclosure, for the convenience of description, the next-generation wireless access technology is referred to as a new radio access technology (New RAT; NR) and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC.

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Further, numerology may be configured in such a structure that time/frequency granularity is dynamically allocated depending on each service (e.g., eMBB, URLLC, or mMTC) and scenarios (e.g., high speed).

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
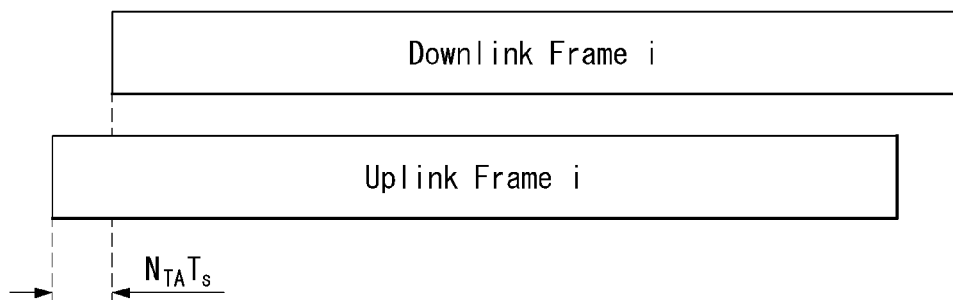
FIG. 2 illustrates a relationship between a uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a user equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 3 represents the number of OFDM symbols in an extended CP, the number of slot per radio frame and the number of slot per subframe.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
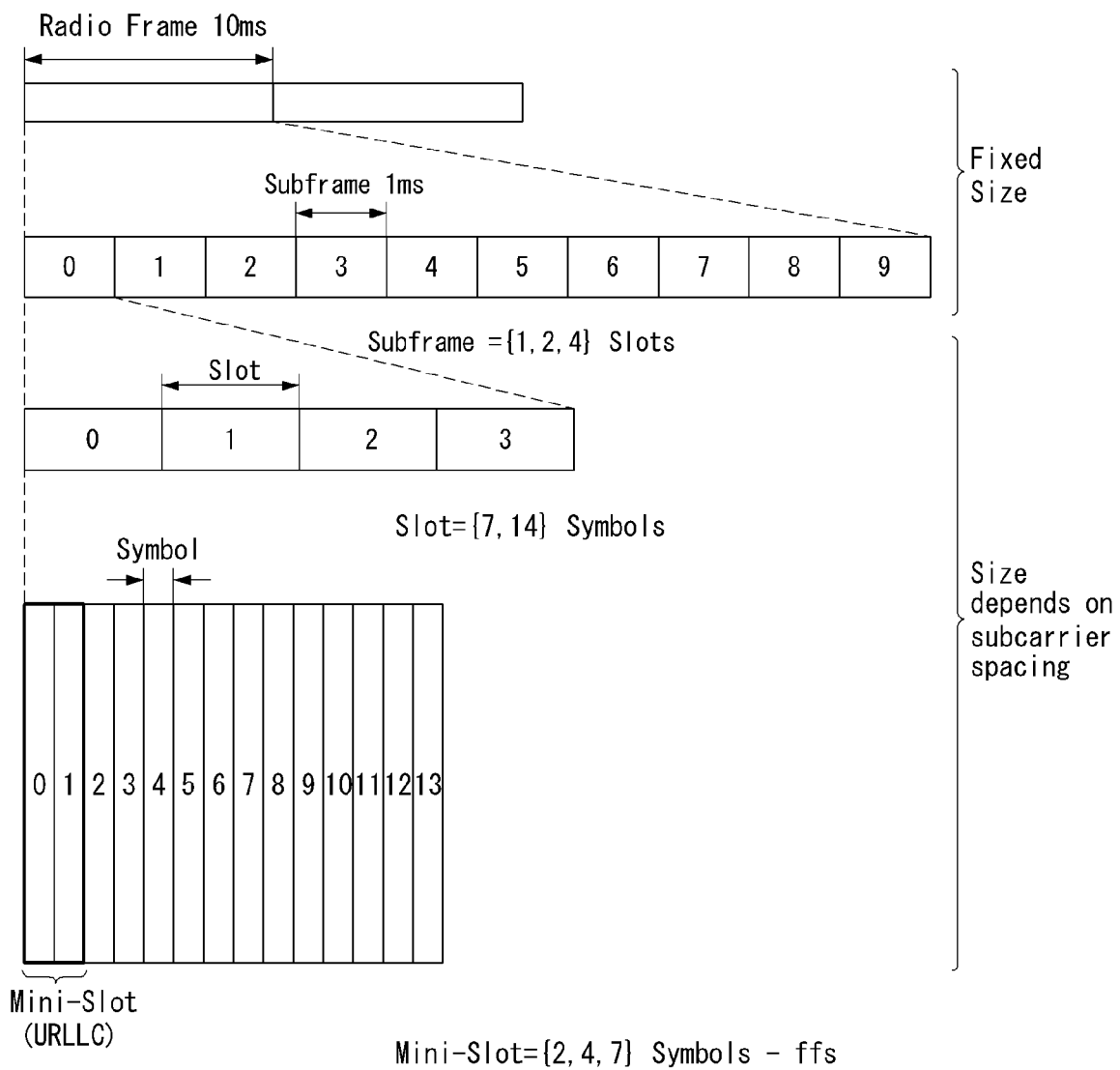
FIG. 3 illustrates an example of a frame structure in the NR system.

FIG. 3 illustrates an example of a frame structure in the NR system. FIG. 3 is shown just for the convenience of description but is not intended to limit the scope of the present disclosure.

Table 3 represents an example of μ=2, that is, the case that subcarrier spacing is 60 kHz. Referring to Table 2, 1 subframe (or frame) may include 4 slots. 1 subframe={1,2, 4} slots shown in FIG. 3 are an example, and the number of slot(s) included in 1 subframe can be defined as represented in Table 2.

In addition, a mini-slot may include 2, 4 or 7 symbols, or include the more or the less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 4:
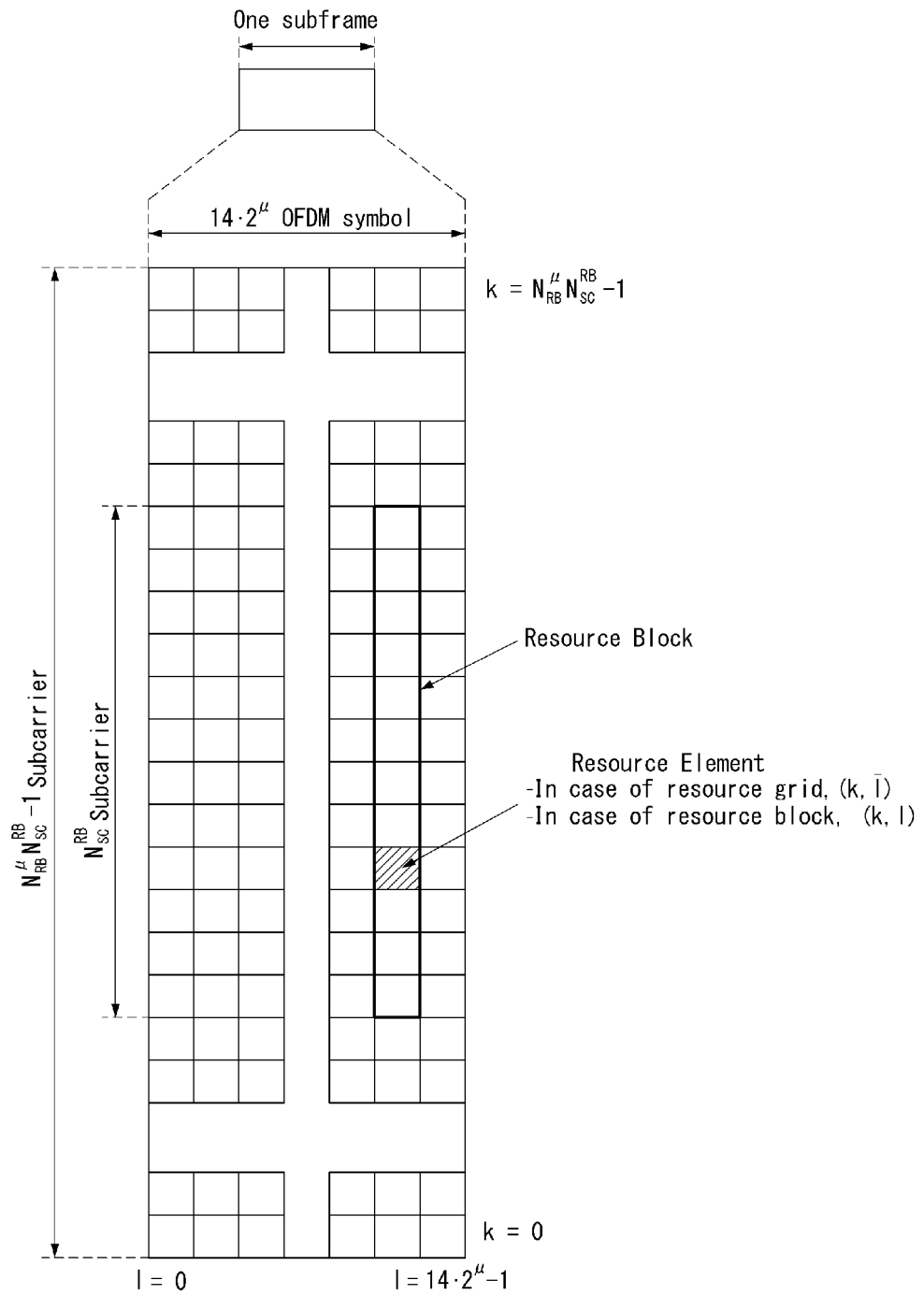
FIG. 4 illustrates an example of a resource grid supported in a wireless communication system to which a method proposed by the present disclosure may be implemented.

FIG. 4 illustrates an example of a resource grid supported in a wireless communication system to which a method proposed by the present disclosure may be implemented.

Referring to FIG. 4, a resource grid is composed of $N_{RB}^\mu N_{sc}^{RB}$ subcarriers in a frequency domain, each subframe composed of $14 \cdot 2^\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols, wherein $N_{RB}^\mu \leq N_{RB}^{max,\mu}$. The above $N_{RB}^{max,\mu}$ indicates the maximum transmission bandwidth, and it may change not just between numerologies, but between UL and DL.

Figure 5:
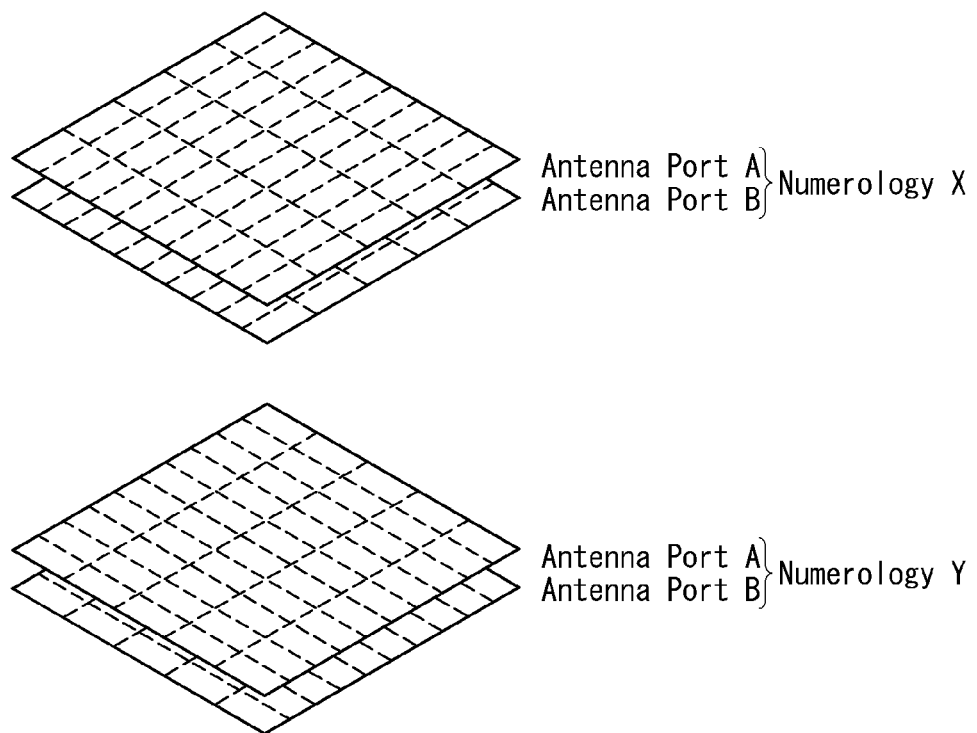
FIG. 5 illustrates examples of resource grids for each antenna port and numerology to which a method proposed in this specification may be applied.

In this case, as illustrated in FIG. 5, one resource grid may be configured for the numerology μ and an antenna port p.

FIG. 5 illustrates examples of resource grids for each antenna port and numerology to which a method proposed in this specification may be applied.

Each element of the resource grid for the numerology μ and the antenna port p is indicated as a resource element, and may be uniquely identified by an index pair (k,l̄). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k,l̄) is used. Herein, $l=0, \ldots, N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ consecutive subcarriers on a frequency domain.

Point A plays the role of a common reference point of the resource block grid and may be obtained as follows.

offsetToPointA with respect to Pcell downlink represents a frequency offset between the lowest subcarrier of the lowest resource block overlapped with SS/PBCH block used by a UE for an initial cell selection with point A, and represents by resource block units assuming 15 kHz subcarrier spacing for FR1 and 60 kHz subcarrier spacing for FR2;

absoluteFrequencyPointA represents frequency-position of point A represented as in absolute radio-frequency channel number (ARFCN).

Common resource blocks are numbered from 0 to upper sides in a frequency domain for subcarrier spacing configuration μ.

The center of subcarrier 0 of common resource block 0 for the subcarrier spacing configuration μ coincides with 'point A'. Resource element (k, l) for the common resource block number and the subcarrier spacing configuration μ in a frequency domain may be given as represented in Equation 1 below.

$$n_{CRB}^{\mu} = \left\lfloor \frac{k}{N_{sc}^{RB}} \right\rfloor \quad \text{[Equation 1]}$$

Herein, k may be defined relatively to point A such that k=0 corresponds to the subcarrier with point A in the center. The number from 0 to $N_{BWP,i}^{size}-1$ are numbered to the physical resource blocks in a bandwidth part (BWP) and i is the number of the BWP. In BWP i, the relation between the physical resource block $n_{PRB}$ and the common resource block $n_{CRB}$ may be given as represented in Equation 2 below.

$$n_{CRB} = n_{PRB} + N_{BWP,i}^{start} \quad \text{[Equation 2]}$$

Herein, $N_{BWP,i}^{start}$ may be the common resource block in which the BWP starts relatively to common resource block 0.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

Figure 6:
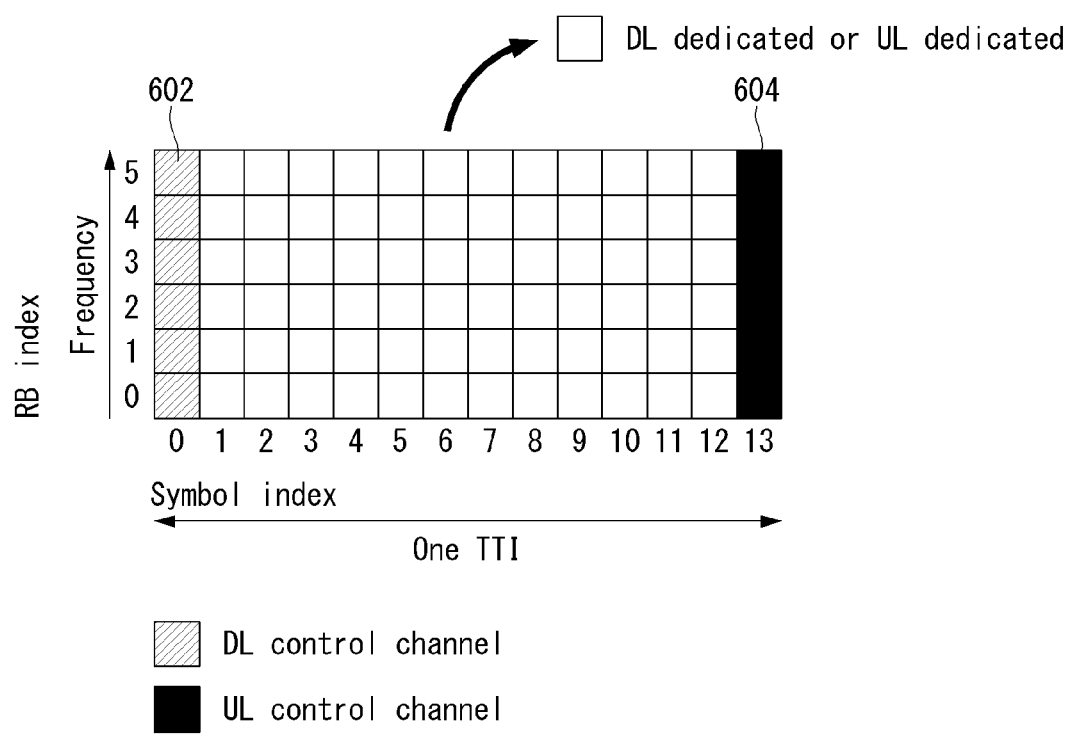
FIG. 6 illustrates one example of a self-contained structure to which the method proposed in this disclosure may be applied.

FIG. 6 illustrates one example of a self-contained structure to which the method proposed in this disclosure may be applied. FIG. 6 is shown just for convenience of the description and does not limit the scope of the present disclosure.

Referring to FIG. 6, it is assumed that one transmission unit (e.g., slot or subframe) is constituted by 14 orthogonal frequency division multiplexing (OFDM) symbols as in legacy LTE.

In FIG. 6, a region 602 refers to a downlink control region and a region 604 refers to an uplink control region. Further, a region (that is, a region without a separate indication) other than the regions 602 and 604 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 6 is used, in one self-contained slot, downlink transmission and uplink transmission may sequentially proceed, and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 6, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

PUCCH Format in NR System

In NR systems, multiple PUCCH formats may be defined by duration and/or payload size. As an example, the following Table 4 represents PUCCH formats considered in NR system.

TABLE 4

| Format | PUCCH length in OFDM symbols | Number of bits | [Usage] | Etc. |
|---|---|---|---|---|
| 0 | 1-2 | ≤2 | HARQ, SR | Sequence selection |
| 1 | 4-14 | ≤2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [≤N] | HARQ, CSI, [SR] | DFT-s-OFDM (Pre DFT OCC) |

Referring to Table 4, format 0 and format 2 are classified as short PUCCH, and format 1, format 3, and format 4 are classified as long PUCCH. In NR systems, transmit diversity schemes for PUCCH and simultaneous transmission of PUSCH and PUCCH may not be supported.

NR Antenna Switching

NR systems may support inter-slot antenna switching and intra-slot antenna switching. In the case of intra-slot antenna switching, a guard period may be configured.

In the case of 1 transmission 2 reception (1T2R)/2 transmission 4 reception (2T4R), the UE may be configured with two SRS resources made up with one symbol or two symbols. In contrast, in the case of 1 transmission 4 reception (1T4R), the UE may be configured with four SRS resources all made up with a single symbol and a single port.

The respective ports of the configured resources may be associated with different UE antennas.

Analog Beamforming

Millimeter wave (mmW) allows for installation of multiple antenna elements in the same area thanks to its short wavelength. In other words, in the 30 GHz band, the wavelength is 1 cm, and a total of 64 (8×8) antenna elements may be installed in a 2-dimensional array at every 0.5 lambda (i.e., wavelength) interval in the 4×4 (4 by 4) (cm) panel. Hence, mmW increases coverage or throughput by raising beamforming (BF) gain by use of multiple antenna elements.

In this case, a transceiver unit (TXRU) to enable adjustment of transmission power and phase per antenna element allows for independent beamforming per frequency resource. However, installing TXRUs in all of the 100 antenna elements is impracticable in terms of price. Hence, a scheme being in consideration is to map multiple antenna elements to one TXRU and to adjust the direction of beam with an analog phase shifter. Such analog BF scheme may create only one beam direction over the entire band and is thus unable to achieve selective BF.

As a middle form between digital BF and analog BF, there may be considered hybrid BF with B TXRUs which are fewer than Q antenna elements. In this case, although there are differences in connections between B TXRUs and Q antenna elements, the number of beam directions in which simultaneous transmission is possible is limited to B or less.

Representative example connections between TXRU and antenna element are described with reference to the drawings.

Figure 7A:
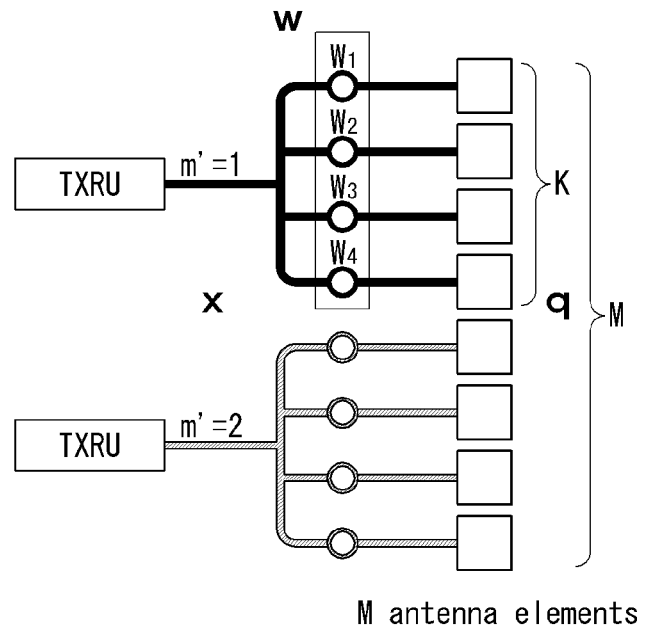
FIGS. 7A and 7B illustrate an example transceiver unit model in a wireless communication system to which the disclosure may apply.
Figure 7B:
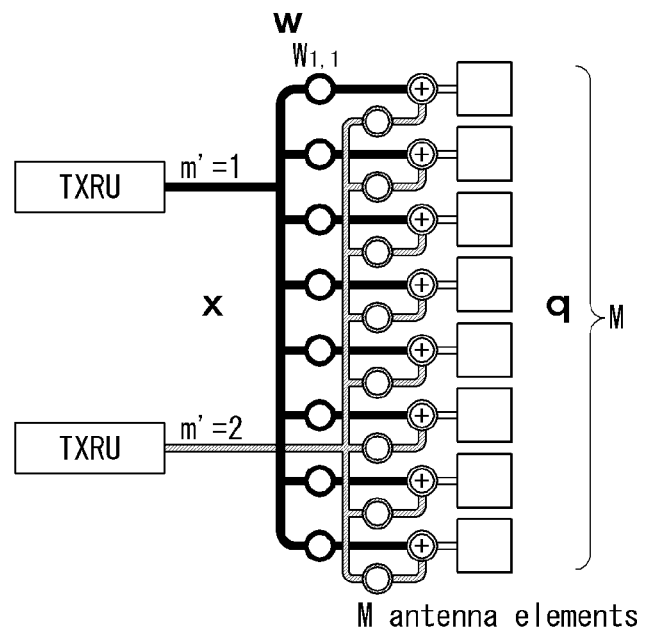

FIGS. 7A and 7B illustrate an example transceiver unit model in a wireless communication system to which the disclosure may apply.

The TXRU virtualization model represents the relationship between TXRU output signal and antenna element output signal. Depending on the correlation between antenna element and TXRU, they may be divided into TXRU virtualization model option-1: sub-array partition model as shown in FIG. 7A and TXRU virtualization model option-2: full-connection model as shown in FIG. 7B.

Referring to FIG. 7A, in the case of sub-array partition model, antenna elements are split into multiple antenna element groups, and each TXRU is connected with one of the groups. In this case, the antenna element is connected to only one TXRU.

Referring to FIG. 7B, in the case of full-connection model, multiple TXRU signals are combined and transmitted to a single antenna element (or antenna element array). In other words, this denotes a scheme in which the TXRUs are connected to all the antenna elements. In this case, the antenna element is connected to all the TXRUs.

In FIGS. 7A and 7B, q is the transmission signal vector of M co-polarized antenna elements in one column. w is the wideband TXRU virtualization weight vector, and W refers to the phase vector multiplied by the analog phase shifter. That is, the direction of analog beamforming is determined by W. x is the signal vector of M_TXRU TXRUs.

Here, mapping between antenna ports and TXRUs may be 1-to-1 or 1-to-many.

The TXRU-to-element mapping shown in FIGS. 7A and 7B is merely an example, and the disclosure is not limited thereto. The disclosure may apply likewise to TXRU-to-antenna element mapping that may be implemented in other various forms in terms of hardware.

Hybrid Beamforming

New RAT (NR) systems consider hybrid beamforming that combines digital beamforming and analog beamforming if multiple antennas are used.

At this time, analog beamforming (or RF beamforming) may mean precoding (or combining) at the RF end. In hybrid beamforming, the baseband end and the RF end each perform precoding (or combining) and this may advantageously reduce the number of RF chains and the number of digital (D)/analog (A) (or A/D) converters while delivering a performance close to that of digital beamforming.

The hybrid beamforming structure may be represented with N transceiver units (TXRUs) and M physical antennas. Digital beamforming for L data layers to be transmitted from the transmit end may be represented as N by L (N×L) matrix, and the converted N digital signals may be converted later into analog signals via TXRU and may then be subject to analog beamforming that is represented as M by N (M×N) matrix.

Figure 8:
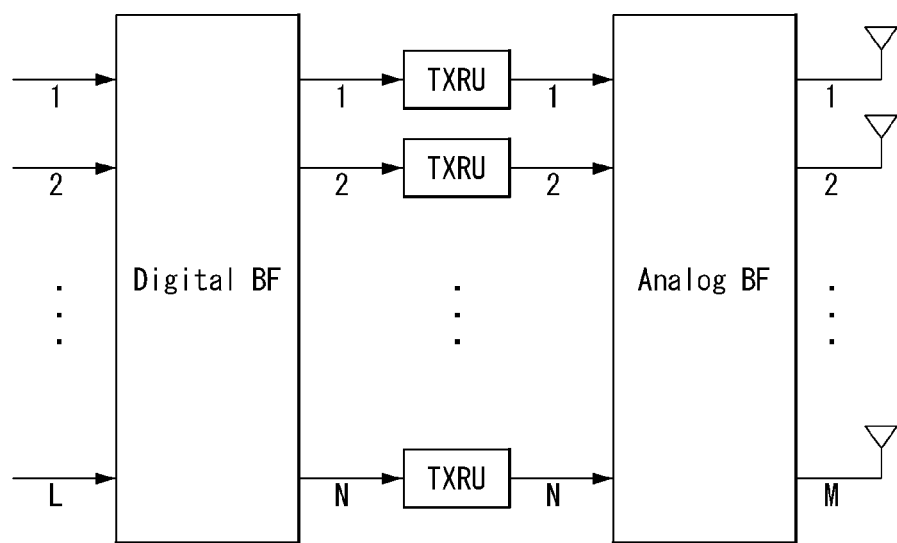
FIG. 8 illustrates an example hybrid beamforming structure from a point of view of TXRU and physical antenna.

FIG. 8 illustrates an example hybrid beamforming structure from a point of view of TXRU and physical antenna.

Referring to FIG. 8, it is assumed that the number of digital beams is L, and the number of analog beams is N.

In NR systems, base station is designed to be able to vary analog beamforming in symbol units so that more efficient beamforming may be supported for UEs which are positioned in a specific area. Further, when N specific TXRUs and M RF antennas are defined as one antenna panel in FIG. 8, adoption of a plurality of antenna panels to each of which independent hybrid beamforming is applicable is considered for NR systems.

As set forth above, if the base station utilizes a plurality of analog beams, analog beams which are better for signal reception may differ per UE. Thus, beam sweeping is considered, at least, for synchronization signal, system information, and paging-beam sweeping changes, per symbol, analog beams that the base station is to apply in a specific subframe (SF) to allow all UEs to have a chance of reception.

Figure 9:
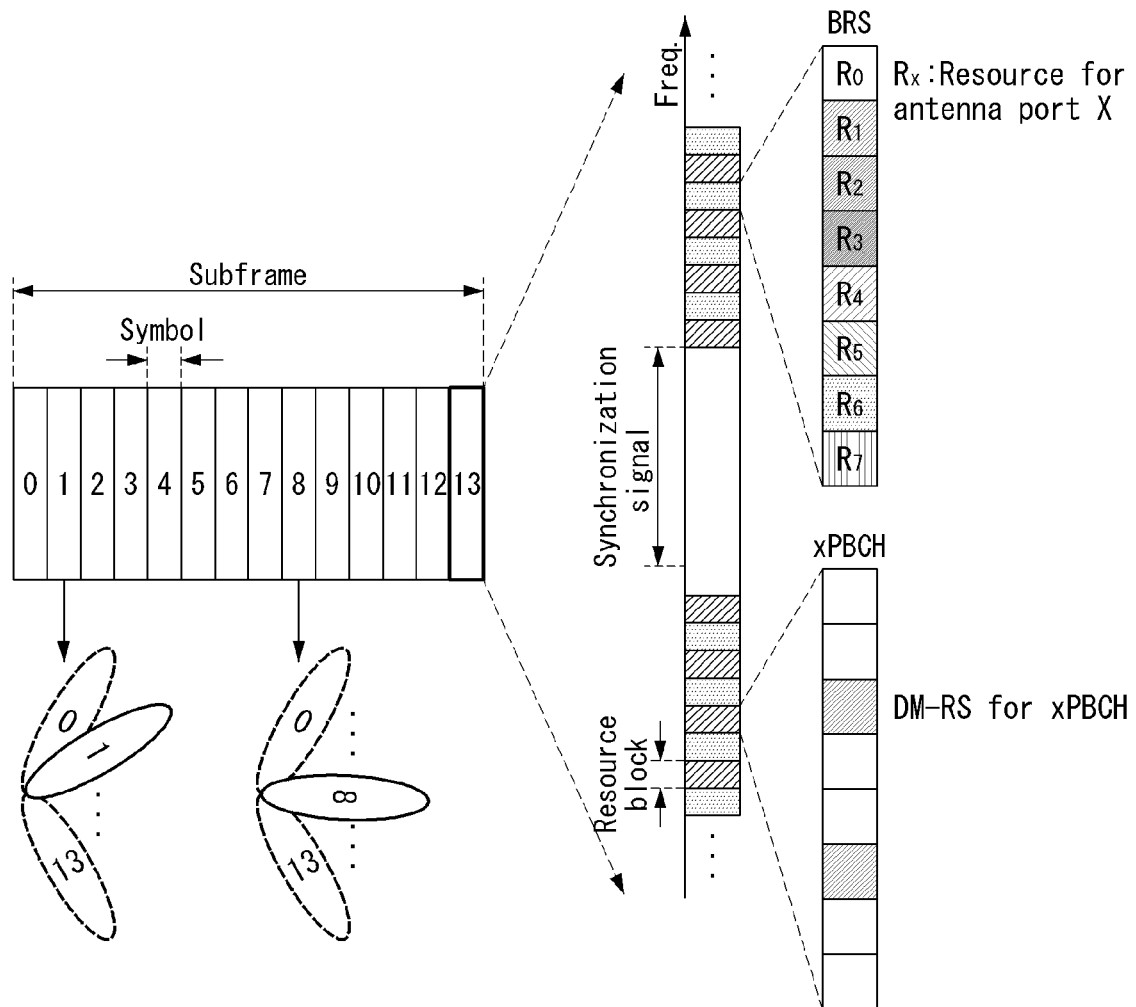
FIG. 9 illustrates an example beam sweeping operation on a synchronization signal and system information.

FIG. 9 illustrates an example beam sweeping operation on a synchronization signal and system information.

Referring to FIG. 9, beam sweeping is assumed on synchronization signal and system information in the downlink transmission process, and physical resource (or physical channel) in which system information of NR system is broadcast may be denoted x-Physical Broadcast Channel (xPBCH).

At this time, analog beams belonging to different antenna panels in one symbol may be simultaneously transmitted and, for channel measurement per analog beam, there may be considered a method of adopting a beam RS (BRS) which is a reference signal (RS) transmitted, with a single analog beam (corresponding to a specific antenna channel) applied, as shown in FIG. 9.

Here, BRS may be defined for a plurality of antenna ports, and each antenna port of BRS may correspond to the single analog beam. At this time, unlike BRS, synchronization signal or xPBCH may be transmitted, with all analog beams in the analog beam group applied, so as to be received well by any UE.

SRS Transmission in NR System

In NR systems, an SRS sequence for SRS resources may be generated by Equation 3 below.

$$r^{(p_i)}(n,l') = r_{u,v}^{(\alpha_i,\delta)}(n)$$

$$0 \leq n \leq 271 \cdot N_{sc}^{RB}/K_{TC}$$

$$l' \in \{0,1,\ldots,N_{symb}^{SRS}-1\} \quad \text{[Equation 3]}$$

In Equation 3, $r_{u,v}^{(\alpha_i,\delta)}(n)$ denotes the sequence number (v) of SRS and the sequence set by the sequence group (u), and the transmission comb (TC) number, K_TC($K_{TC}$), may be included in the higher layer parameter, SRS-TransmissionComb.

Further, for antenna port $p_i$, the cyclic shift (SC) $\alpha_i$ may be given as in Equation 4 below.

$$\alpha_i = 2\pi \frac{n_{SRS}^{cs,i}}{n_{SRS}^{cs,max}} \quad \text{[Equation 4]}$$

$$n_{SRS}^{cs,i} = \left(n_{SRS}^{cs} + \frac{n_{SRS}^{cs,max} p_i}{N_{ap}}\right) \bmod n_{SRS}^{cs,max}$$

In Equation 4, $n_{SRS}^{cs} \in \{0, 1, \ldots, n_{SRS}^{cs,max}\}$ may be given by the higher layer parameter SRS-CyclicShiftConfig. Further, the maximum value of the cyclic shift, if K_TC is 4, may be 12 (i.e., $n_{SRS}^{cs,max}=12$) and, if K_TC is 2, 8 (i.e., $n_{SRS}^{cs,max}=8$).

The sequence group (u) (u=($f_{gh}(n_{s,f}^{\mu},l')+n_{ID}^{SRS}$) mod 30)mod 30) and the sequence number (u) may comply with the higher layer parameter SRS-GroupSequenceHopping. Further, the SRS sequence identifier $n_{ID}^{SRS}$ may be given by the higher layer parameter SRS-SequenceId. l' (i.e., l' ∈ {0, 1, ..., $N_{symb}^{SRS}-1$}) denotes the OFDM symbol number in the SRS resource.

At this time, if SRS-GroupSequenceHopping is 0, group hopping and sequence hopping are not used, which may be represented as in Equation 5 below.

$$f_{gh}(n_{s,f}^{\mu},l')=0$$

$$v=0 \quad \text{[Equation 5]}$$

In Equation 5, f_gh(x, y) denotes sequence group hopping, and v denotes sequence hopping.

Or, if SRS-GroupSequenceHopping is 1, group hopping, not sequence hopping, is used, and this may be expressed as in Equation 6.

$$f_{gh}(n_{s,f},l')=\left(\sum_{m=0}^{7}c(8(n_{s,f}^{\mu}N_{symb}^{SRS}+l')+m)\cdot 2^m\right) \bmod 30$$

$$v=0 \quad \text{[Equation 6]}$$

In Equation 6, f_gh(x, y) denotes sequence group hopping, and v denotes sequence hopping. c(i) denotes the pseudo-random sequence and may be initialized as $c_{init}=\lfloor n_{ID}^{SRS}/30 \rfloor$ at the start of each radio frame.

Or, if SRS-GroupSequenceHopping is 2, sequence hopping, not group hopping, is used, and this may be expressed as in Equation 7.

$$f_{gh}(n_{s,f},l')=0 \quad \text{[Equation 7]}$$

$$v = \begin{cases} c(n_{s,f}N_{symb}^{SRS}+l') & M_{sc,b}^{SRS} \geq 3N_{sc}^{RB} \\ 0 & \text{otherwise} \end{cases}$$

In Equation 7, f_gh(x, y) denotes sequence group hopping, and v denotes sequence hopping. c(i) denotes the pseudo-random sequence and may be initialized as $c_{init}=\lfloor n_{ID}^{SRS}/30 \rfloor \cdot 2^5 + (n_{ID}^{SRS}+\Delta_{ss}) \bmod 30$ at the start of each radio frame (where, $\Delta_{ss} \in \{0,1,\ldots,29\}$).

Sounding Reference Signal (SRS) Hopping

SRS hopping may be performed only upon periodic SRS triggering (e.g., triggering type 0). Further, allocation of SRS resources may be provided according to a pre-defined hopping pattern. In this case, the hopping pattern may be designated UE-specifically via higher layer signaling (e.g., RRC signaling) and no overlap is allowed.

Further, SRS is frequency-hopped using the hopping pattern in every subframe where cell-specific and/or UE-specific SRS is transmitted, and the start position and hopping equation in the frequency domain of SRS hopping may be interpreted via Equation 8 below.

$$k_0^{(p)} = \bar{k}_0^{(p)} + \sum_{b=0}^{B_{SRS}} {'}K_{TC}M_{sc,b}^{RS}n_b \quad \text{[Equation 8]}$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2)\left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

$$n_{SRS} = \begin{cases} 2N_{SP}n_f + 2(N_{SP}-1)\left\lfloor \frac{n_s}{10} \right\rfloor + \left\lfloor \frac{T_{offset}}{T_{offset\_max}} \right\rfloor, & \text{for 2 ms } SRS \text{ periodicity of frame structure type 2} \\ \lfloor (n_f \times 10 + \lfloor n_2/2 \rfloor)/T_{SRS} \rfloor, & \text{otherwise} \end{cases}$$

In Equation 8, $n_{SRS}$ means the hopping interval in the time domain, and $N_b$ denotes the number of branches allocated to tree level b where b may be determined by the $B_{SRS}$ settings in dedicated RRC.

Figure 10:
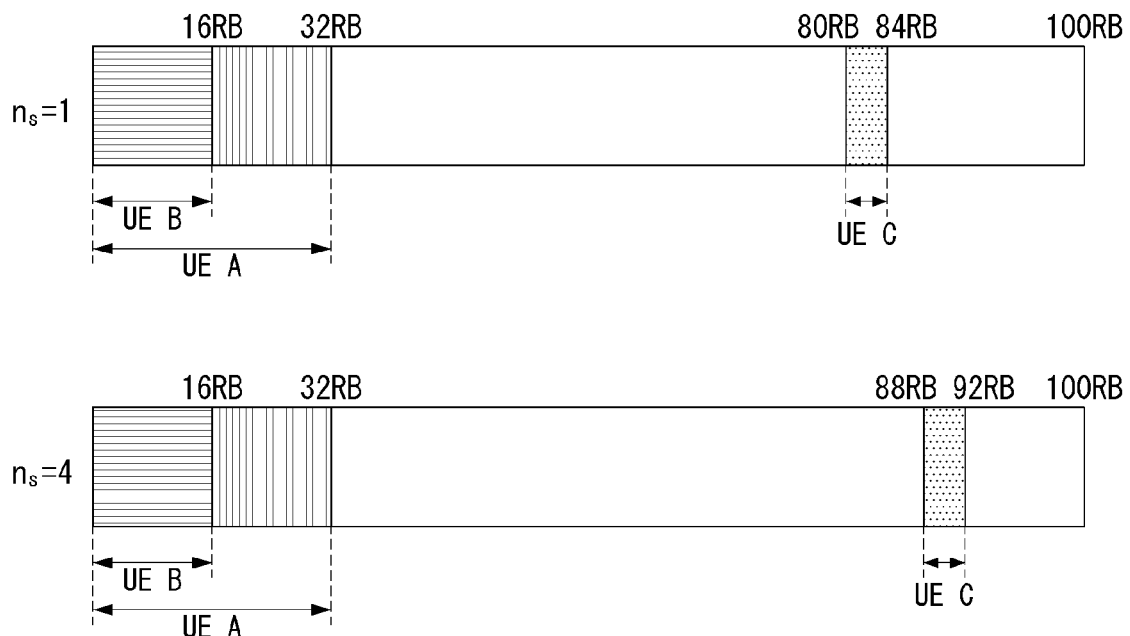
FIG. 10 illustrates an example method of configuring an SRS hopping pattern.

FIG. 10 illustrates an example method of configuring an SRS hopping pattern. Specifically, FIG. 10 illustrates an example hopping pattern from slot $n_s$=1 to slot $n_s$=4.

In FIG. 10, it is assumed that $C_{SRS}$, N^UL_RB, $n_f$ and $n_s$ are set to $C_{SRS}$=1, N^UL_RB=100, $n_f$=1 and $n_s$=1, respectively, via cell-specific signaling (e.g., cell-specific RRC signaling). For UEs A, B, and C, $B_{SRS}$, $b_{hop}$, $n_{RRC}$, and $T_{SRS}$ may be set via UE-specific signaling (e.g., UE-specific RRC signaling). Specifically, UE A may be set to $B_{SRS}$=1, $b_{hop}$=1, $n_{RRC}$=22, and $T_{SRS}$=10, UE B to $B_{SRS}$=2, $b_{hop}$=0, $n_{RRC}$=10, and $T_{SRS}$=5, and UE C to $B_{SRS}$=3, $b_{hop}$=2, $n_{RRC}$=23, and $T_{SRS}$=2.

As mentioned above, in the next-generation wireless communication system (hereinafter, "NR system" for convenience), there may be UEs (e.g., 1T4R UE, 1T2R UE, 2T4R UE, etc.) that need to perform SRS antenna switching.

Where transmission of other uplink channel (e.g., physical uplink shared channel (PUSCH) or physical uplink control channel (PUCCH)) is transmitted, such UEs may perform UL transmission without changing transmission antennas in the transmission time unit (e.g., slot) only when the used transmission antenna (Tx antenna) matches the SRS transmission antenna. In other cases, i.e., when the transmission antenna of other uplink channel differs from the SRS transmission antenna, a transition time for changing transmission antennas may be needed. In other words, it may be required to configure symbol(s) considering the transition time between other uplink channel and SRS.

Here, the symbol(s) may be denoted a guard period (in particular, a guard period for antenna switching) and may be made up with Y symbols. Here, the guard period may be configured upon antenna switching between SRS resources, and this may be defined according to numerology (μ) (e.g., subcarrier spacing) (Δf)). As an example, Y symbols may mean Y OFDM symbols.

The above-described guard period, i.e., Y symbols, may be defined as in Table 5 below. Table 5 represents an example (minimum) guard period between SRS resources in the SRS resource set for antenna switching. In other words, the guard period may be configured considering the SRS resources constituting the SRS resource set.

TABLE 5

| μ | Δf = $2^μ$ · 15[kHz] | Y [symbol] |
|---|---|---|
| 0 | 15 | 1 |
| 1 | 30 | 1 |
| 2 | 60 | 1 |
| 3 | 120 | 2 |

In particular, it is assumed that the timing offset of PUSCH resource allocated to UL grant is denoted X, the timing offset between SRS triggering DCI and SRS transmission is denoted Z, and the timing offset of sPUCCH (short PUCCH0 is denoted M.

At this time, such an occasion where Z is smaller than X and/or Z is smaller than M may arise. In this case, transmission of PUSCH, sPUCCH, and/or SRS may be allocated to the same slot (e.g., slot n) as shown in FIGS. 11A and 11B.

Figure 11A:
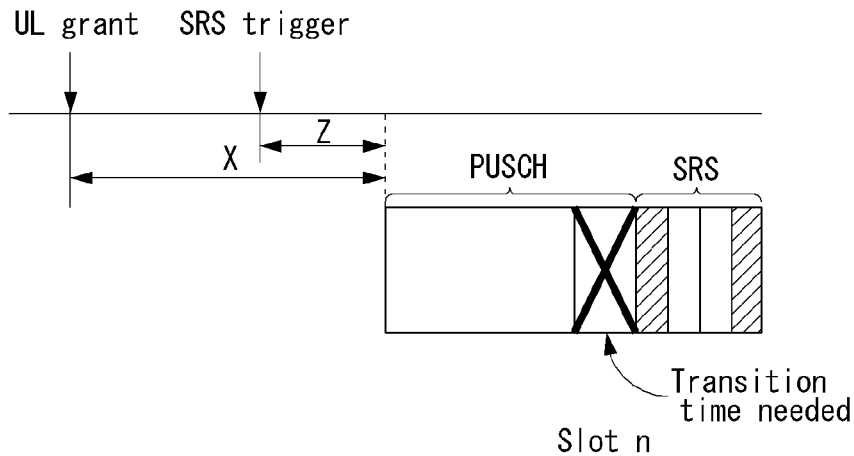
FIGS. 11A and 11B illustrate an example of uplink transmission considering a transmission offset and SRS triggering offset for a UL grant.
Figure 11B:
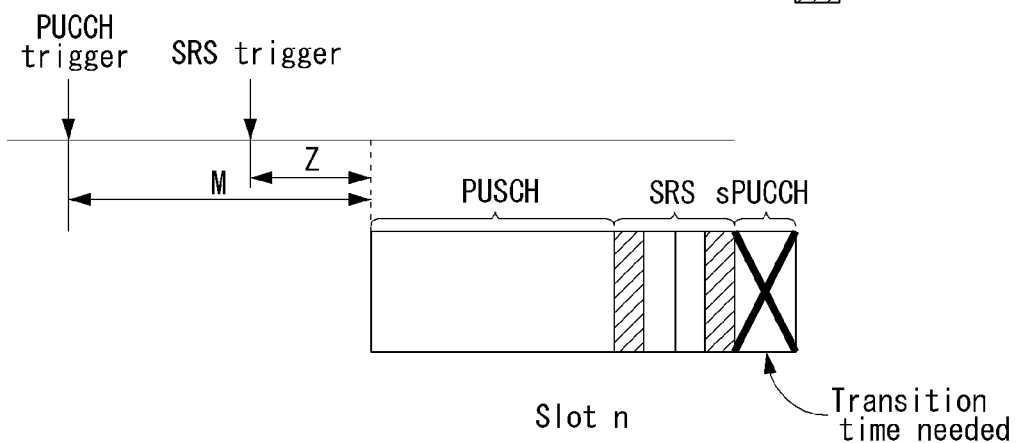

FIGS. 11A and 11B illustrate an example of uplink transmission considering a transmission offset and SRS triggering offset for a UL grant. FIGS. 11A and 11B is intended merely for illustration purposes but not for limiting the scope of the disclosure.

Referring to FIGS. 11A and 11B, X may mean the offset from the time of reception of UL grant by UE to the time of performing PUSCH transmission scheduled by UL grant, and Z may mean the offset from the time of reception of DCI triggering SRS by UE to the time of performing actual SRS transmission. In this case, slot n may mean the slot in which transmission of PUSCH scheduled by UL grant and transmission of SRS by SRS triggering DCI are performed (or allocated).

Further, it is assumed that four SRS symbols are allocated to the UE supporting antenna switching, and the subcarrier spacing is 120 kHz (i.e., the number of Y symbols is 2). This is merely for ease of description and, if a different number of SRS symbol(s) are allocated and when a different subcarrier spacing (i.e., other numerology) applies, that may apply as well.

For example, in a case where Z is smaller than X as shown in FIG. 11A, when the base station transmits a UL grant (e.g., DCI for scheduling UL data) to the UE, the base station may allocate the resource region, which does not consider multiplexing with SRS, to the PUSCH resource. Thus, of the PUSCH symbol region allocated, by the base station, to the resource for UL data transmission, the symbol region adjacent to the SRS may get through performance deterioration if the above-described guard period according to SRS antenna switching is not secured. In other words, if PUSCH transmission and SRS transmission are set to be adjacent to each other, a guard period for antenna switching (i.e., a transition time for antenna switching) may be needed.

As another example, in a case where Z is smaller than M as shown in FIG. 11B, when the base station transmits DCI for triggering PUCCH transmission to the UE, the base station may allocate the resource region, which does not consider multiplexing with SRS, to the PUCCH resource. In this case, similar to the above-described example, performance deterioration may occur upon detecting the control information (e.g., uplink control information (UCI)) transmitted via PUCCH.

Described in the disclosure is a method of configuring and/or indicating a guard period for, e.g., antenna switching when SRs transmission and other uplink transmission are configured so as to prevent performance deterioration.

Specifically, a method of configuring and/or indicating a guard period considering the relationship between PUSCH and/or PUCCH transmission and SRS transmission (hereinafter, a first embodiment) and a scheme of addressing collision between the guard period and SRS resource set (i.e., SRS resources) (hereinafter, a second embodiment) are described.

Although the disclosure is described, for ease of description, in connection with the guard period in the relationship between PUSCH and/or PUCCH transmission and SRS transmission and the relationship between guard period and SRS resource(s) (e.g., SRS resource set), the methods described below are not limited thereto but may rather apply in connection with other uplink transmission.

Further, for ease of description, the term "guard period" as mentioned in the disclosure may mean a gap symbol, gap, Y symbols, Y-symbol gap, or Y gap symbols for the above-described antenna switching. In other words, guard period, gap symbol, gap, Y symbols, Y symbol gap, and Y gap symbols may mean the same in the disclosure.

Further, the embodiments and/or methods described in the disclosure are differentiated solely for ease of description, and some components in any one method may be replaced, or combined with components of another method. For example, methods described in the first embodiment and methods described in the second embodiment may be combined together.

First Embodiment

In the instant embodiment, described is a method of configuring and/or indicating a guard period considering the relationship between PUSCH and/or PUCCH transmission and SRS transmission.

As mentioned above, the methods described in the embodiment may apply to other uplink transmission than PUSCH and/or PUCCH.

Method 1)

In the case of antenna switching-supporting UE (i.e., UE with antenna switching capability), Y symbols (i.e., guard period) may be configured and/or indicated via higher layer signaling between PUSCH or PUCCH and SRS transmission (e.g., RRC signaling), MAC layer signaling (e.g., MAC-CE), and/or downlink control information (DCI). In this case, the Y symbols may be configured and/or indicated considering numerology (e.g., subcarrier spacing).

At this time, (configuration) information related to the Y symbols may include one or more of the following elements.

Y symbol position index (e.g., Y symbol start position index)

Number of Y symbols

Whether a guard period is configured between PUSCH and/or PUCCH and SRS

In particular, information about whether a guard period is configured between PUSCH and/or PUCCH and SRS may be separately configured and/or indicated depending on when PUSCH and/or PUCCH is transmitted in symbol(s) ahead of SRS and when PUSCH and/or PUCCH is transmitted in symbol(s) behind SRS. Further, the information may be configured and/or indicated separately depending on whether a guard period is configured before SRS transmission or after SRS transmission for the case where SRS is positioned between PUSCH and/or PUCCH symbols.

In connection, the Y symbol position index and/or the number of Y symbols may be configured and/or indicated according to the following schemes. In other words, the base station may configure and/or indicate the Y symbols (i.e., guard period) for the UE using the settings shown in Tables 6 to 8 below. In other words, the UE may receive a configuration and/or indication of Y symbols (i.e., guard period) from the base station using the settings as shown in Tables 6 to 8.

The following Table 6 represents an example configuration of Y symbols (i.e., guard period) (in particular, when it is configured and/or indicated via DCI). Table 6 represents an example of configuring a guard period by joint-encoding the Y symbol position index and the number of Y symbols (the number of symbols according to numerology).

TABLE 6

| symbol gap configuration ($G_{SRS}$) between PUCCH/PUSCH and SRS | Y symbol start position index (0 to 13) | Number of Y symbols |
|---|---|---|
| 0 (symbol gap configuration off) | — | — |
| 1~7 | $G_{SRS} + 6$ | 1 |
| 8~14 | $G_{SRS} - 1$ | 2 |
| 15 | Reserved | Reserved |

Referring to Table 6, a configuration (i.e., G_SRS) for Y symbols may be represented as 16 states and may be configured as 4-bit information. As an example, if G_SRS is 5, the Y symbol start position index may be 11, and the number of Y symbols is 1.

Further, the Y symbol position (i.e., the position of guard period) may be simply represented by signaling information for 'before SRS resource' and/or 'behind SRS resource.' Table 7 represents an example of configuring a guard period with respect to the position of SRS resource.

TABLE 7

| symbol gap configuration ($G_{SRS}$) between PUCCH/PUSCH and SRS | Y symbol position | Number of Y symbols |
|---|---|---|
| 0 | configured first SRS resource first symbol −1 | 1 |
| 1 | configured last SRS resource last symbol +1 | 1 |
| 2 | configured first SRS resource first symbol −2 | 2 |
| 3 | configured last SRS resource last symbol +1 | 2 |
| 4 | configured first SRS resource first symbol −1 and configured last SRS resource last symbol +1 | 1 |
| 5 | configured first SRS resource first symbol −2 and configured last SRS resource last symbol +1 | 2 |
| 6-7 | Reserved | Reserved |

Referring to Table 7, a configuration (i.e., G_SRS) for Y symbols may be represented as 8 states and may be configured as 3-bit information. As an example, if G_SRS is 1, the Y symbols (i.e., guard period) are positioned in the next symbol to the last configured SRS resource, and the number of Y symbols is set to 2.

Further, since the number of Y symbols may be determined according to numerology as described above, the configuration (i.e., G_SRS) for Y symbols may be set as shown in Table 8 below. Table 8 represents an example of configuring a guard period using the feature that the number of Y symbols is determined according to numerology.

TABLE 8

| symbol gap configuration ($G_{SRS}$) between PUCCH/PUSCH and SRS | Y symbol position |
|---|---|
| 0 | configured first SRS resource first symbol −Y (Y is determined according to numerology) |

TABLE 8-continued

| symbol gap configuration ($G_{SRS}$) between PUCCH/PUSCH and SRS | Y symbol position |
|---|---|
| 1 | configured last SRS resource last symbol +1 |
| 2 | configured first SRS resource first symbol −Y (Y is determined according to numerology) and configured last SRS resource last symbol +1 |

Referring to FIG. 8, the configurations of Table 7 may be simplified using the feature that the number of Y symbols is determined according to numerology. In this case, a configuration (i.e., G_SRS) for Y symbols may be represented as 3 states and may be configured as 2-bit information.

Similarly, there may also be considered a method of simultaneously configuring or applying Y symbols (i.e., guard period) before or behind the SRS resource.

Further, the presence or absence of Y symbols (i.e., guard period) and/or, if present, the position (and/or the number of Y symbols) may be predefined (or set) or may be determined implicitly by, e.g., other parameters.

As an example, the position of Y symbols may be set to the last symbol index+1 of the last SRS resource configured for the UE. In this case, the base station may additionally configure and/or indicate to the UE (via signaling) only for whether the guard period is on/off.

At this time, the position of Y symbols may be determined considering the following. Hereinafter, 'subsequent PUSCH and/or PUCCH' may mean that the corresponding channel is transmitted with a smaller spacing (in particular, very next symbol) than the Y symbols after the SRS resource(s) configured for the UE. In particular, this may be determined in the same manner even when it goes beyond the slot boundary.

First, the position of Y symbols may be determined considering whether the PUSCH allocated to the same slot is transmitted. For example, where PUSCH is transmitted, the Y symbols may be configured to be allocated to the head of the first SRS resource(s). Unlike this, unless PUSCH is transmitted, the Y symbols may be configured to be allocated to the tail of the last SRS resource(s) or the configuration (i.e., Y symbol gap configuration) for Y symbols may be turned off. In other words, if PUSCH is transmitted, and SRS resource(s) are allocated to the next symbol(s), the UE may be configured to operate under the assumption that the beam (e.g., beam indicated by SRS resource indication (SRI)) allocated to PUSCH and/or transmit precoding matrix indicator (TPMI)) allocated to PUSCH and beam allocated to the SRS resource(s) of the very next SRS symbol to the PUSCH symbol have the relationship needing a gap (i.e., guard period) for antenna switching.

And/or, the position of Y symbols may be determined considering whether a subsequent PUSCH exists (i.e., is allocated) in the very next slot to the slot where SRS transmission is performed. For example, where there is the subsequent PUSCH, the Y symbols may be configured to be allocated to the tail of the last SRS resource(s). Unlike this, if there is no subsequent PUSCH, the Y symbols may be configured to be allocated to the tail of the last SRS resource(s) or the configuration (i.e., Y symbol gap configuration) for Y symbols may be turned off. In other words, in the very next slot to the slot where SRS is allocated, the UE may be configured to operate under the assumption that the beam (e.g., beam indicated by SRS resource indication (SRI)) allocated to PUSCH and/or transmit precoding matrix indicator (TPMI)) allocated to PUSCH and beam allocated to the SRS resource(s) have the relationship needing a gap (i.e., guard period) for antenna switching.

And/or if the subsequent PUSCH is present in the very next slot to the slot where SRS transmission is performed, the position of Y symbols may be determined considering whether the first k symbols have been allocated to PUSCH. Here, k may be a positive integer equal to or smaller than Y. For example, where k=Y and the first Y symbols of subsequent PUSCH are allocated for PUSCH, the Y symbols may be configured to be allocated to the tail of the last SRS resource(s). Unlike this, if k=Y and the first Y symbols of the subsequent PUSCH are not allocated for PUSCH, the Y symbols may be configured in the first Y symbols of the next slot to the slot where SRS is transmitted. In particular, in this case, a guard period may be configured in the last y1 symbols of the slot where SRS is transmitted and y2 symbols of the next slot to the slot where SRS is transmitted. At this time, the sum of y1 and y2 may be equal to or larger than Y.

And/or, the position of Y symbols may be determined considering whether the subsequent PUCCH is present in the slot where SRS transmission is performed. For example, where there is the PUCCH, the Y symbols may be configured to be allocated to the tail of the last SRS resource(s). Unlike this, if there is no subsequent PUCCH, the Y symbols may be configured to be allocated to the head of the last SRS resource(s) or the configuration (i.e., Y symbol gap configuration) for Y symbols may be turned off.

The above-described items (i.e., conditions) may be applied or determined alone or in combination.

Method 1-1)

Further, where the base station configures Y symbols between PUSCH and/or PUCCH and SRS (i.e., where a symbol gap is configured), the UE may be operated implicitly under the assumption that the transmission beam(s) of SRS resource(s) most adjacent to Y symbols differ from the transmission beam of PUSCH and/or PUCCH adjacent to the Y symbols. In other words, the UE may use the transmission beam(s) of SRS resource(s) most adjacent to the Y symbols, assuming that they are beam(s) for transmission of PUSCH or PUCCH adjacent to the Y symbols and/or beam(s) using a different transmission antenna from the antenna port(s) and/or antenna port (i.e., different UE transmission beam(s) and/or antenna port(s)).

And/or, the UE may perform transmission under the assumption that antenna port(s) and/or beam(s) using the same transmission antenna for SRS and PUCCH and/or PUSCH adjacent to each other has been configured. In other words, the UE may be assumed to perform transmission using the same beam and/or antenna port for the SRS and PUCCH and/or PUSCH the interval between which is smaller than the Y symbols (without Y symbols therebetween) (i.e., the case where no Y symbol gap is configured or indicated between the PUCCH and/or PUCCH and SRS).

Figure 12:
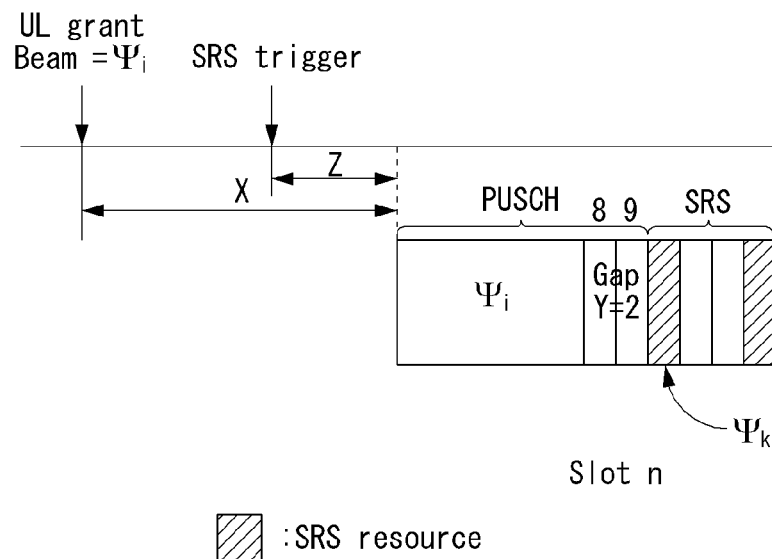
FIG. 12 illustrates examples of PUSCH transmission and SRS transmission to which methods as proposed in the disclosure may apply.

FIG. 12 illustrates examples of PUSCH transmission and SRS transmission to which methods as proposed in the disclosure may apply. FIG. 12 is intended merely for illustration purposes but not for limiting the scope of the disclosure.

Referring to FIG. 12, it is assumed that in the configuration for Y symbols, the Y symbol start position index is 8 and, as numerology (i.e., subcarrier spacing) is 120 kHz, the number of Y symbols is 2 (e.g., G_SRS=9 in Table 6).

Where the beam of PUSCH indicated via UL grant is a UE transmission beam(s) $\Psi_i$ mapped to demodulation reference signal (DMRS) in PUSCH, transmission beam(s) $\Psi_k$ may be allocated (or used) for transmission of SRS in the nth slot. In this case, $\Psi_i$ and $\Psi_k$ may be assumed to have a relationship that may be varied via antenna switching (i.e., they may be identical or differ). At this time, the UE may be not limited in selecting the beams $\Psi_k$ of SRS resource(s) positioned next to the Y symbols according to the position of Y symbols (i.e., the gap) via UE transmission beam information for PUSCH transmission upon reception of UL grant (i.e., beams using different transmission antennas).

Figure 13:
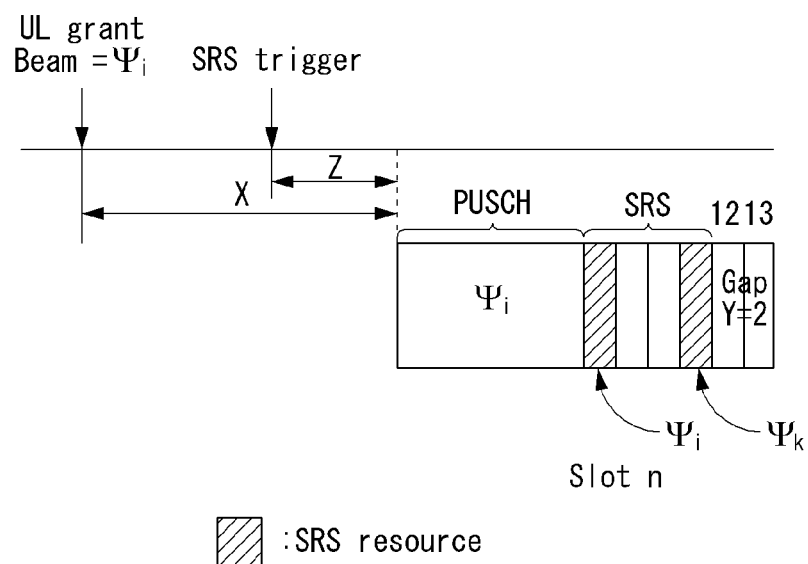
FIG. 13 illustrates other examples of PUSCH transmission and SRS transmission to which methods as proposed in the disclosure may apply.

FIG. 13 illustrates other examples of PUSCH transmission and SRS transmission to which methods as proposed in the disclosure may apply. FIG. 13 is intended merely for illustration purposes but not for limiting the scope of the disclosure.

Referring to FIG. 13, it is assumed that in the configuration for Y symbols, the Y symbol start position index is 8 and, as numerology (i.e., subcarrier spacing) is 120 kHz, the number of Y symbols is 2 (e.g., G_SRS=13 in Table 6).

In this case, the UE may not be limited in selecting beam $\Psi_k$ that has an antenna switching relationship with beam(s) for PUSCH transmission of the next slot in the case of SRS resource(s) in the symbol ahead of the Y symbols (i.e., gap symbol). In contrast, if PUSCH symbols are arranged adjacent ahead of SRS symbols, and beam(s) $\Psi_i$ is configured for PUSCH transmission, the UE may be configured to implicitly select $\Psi_i$ as the beam of SRS resource(s) of the first SRS symbol. In other words, the UE may be configured to implicitly select the beam using the same transmission antenna as the transmission antenna of PUSCH, with the SRS resource(s) of the first SRS symbol.

The above-described scheme may apply where PUCCH and/or PUSCH is transmitted after the last SRS resource(s), in a similar manner in the relationship between SRS and PUSCH and/or PUCCH. In other words, in this case, the base station may deem that the UE transmits the transmission beams of PUSCH and/or PUCCH and SRS resources adjacent to each other using the same transmission antenna.

Method 1-2)

If the base station configures Y symbols for a guard period between PUSCH and/or PUCCH and SRS, the base station may designate (or indicate) the transmission beam(s) and/or antenna port(s) of SRS resource(s) allocated in the SRS symbol most adjacent to Y symbols (i.e., gap symbol) upon SRS triggering as beam(s) and/or antenna port(s) that have an antenna switching relationship with beam(s) and/or antenna port(s) where PUSCH and/or PUCCH is transmitted. In other words, if Y symbols are configured between the PUSCH and/or PUCCH and SRS, the base station may designate the beam for SRS resource and the beam for PUSCH and/or PUCCH as different transmission beam(s) and/or antenna port(s) (using the UE transmission antenna).

And/or, if PUSCH and/or PUCCH and SRS are configured to be adjacent to each other with Y symbols therebetween, the UE may be designated or indicated to use the beam(s) and/or antenna port(s) (e.g., the same beam(s) and/or antenna port(s)) using the same transmission antenna.

At this time, a method that may be considered to designate the beam(s) and/or antenna port(s) is to, for non-codebook-based UL transmission, transmit, to the UE, SRI(s) denoting (i.e., indicating) the beam(s) that have an antenna switching relationship with the PUSCH and/or PUCCH beam(s) among the SRI(s) that the base station has previously transmitted. Another method that may be considered is to, for codebook-based UL transmission, transmit, to the UE, TPMI(s) denoting (i.e., indicating) the beam(s) that have an antenna switching relationship with the PUSCH and/or PUCCH beam(s) among the TPMI(s) that the base station has previously transmitted.

Further, if PUSCH and/or PUCCH and SRS are configured (or indicated) without Y symbols (i.e., gap symbol), the UE may have no expectation of configuration (or indication) of different beam(s) and/or antenna port(s) for SRS resource (and/or symbol) adjacent to the PUSCH and/or PUCCH.

Figure 14A:
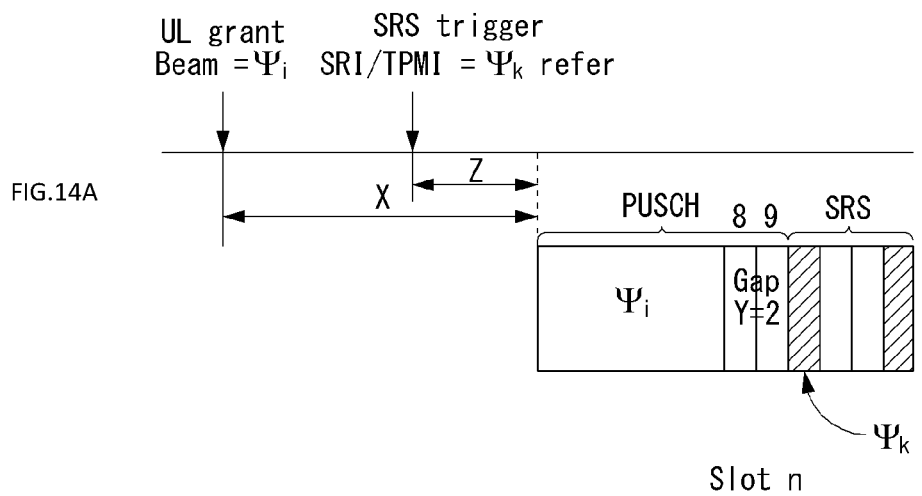
FIGS. 14A and 14B illustrate other examples of PUSCH transmission and SRS transmission to which methods as proposed in the disclosure may apply.
Figure 14B:
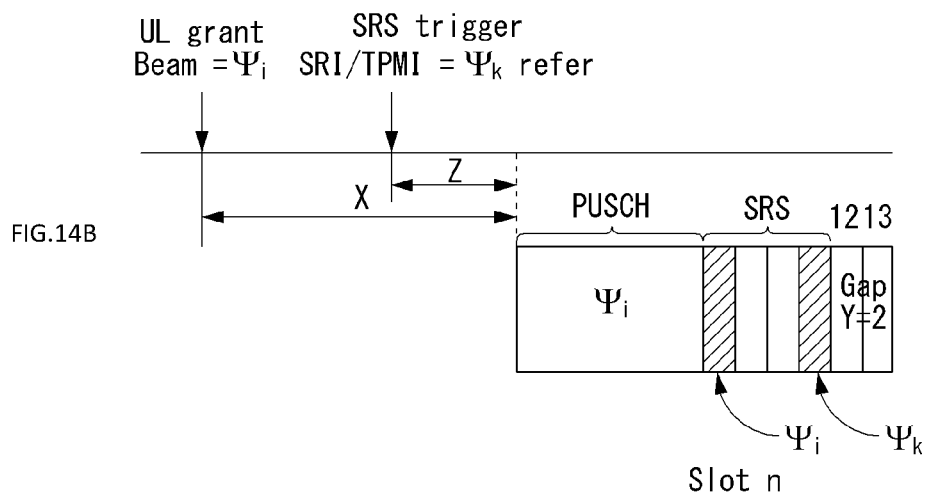
Figure 15A:
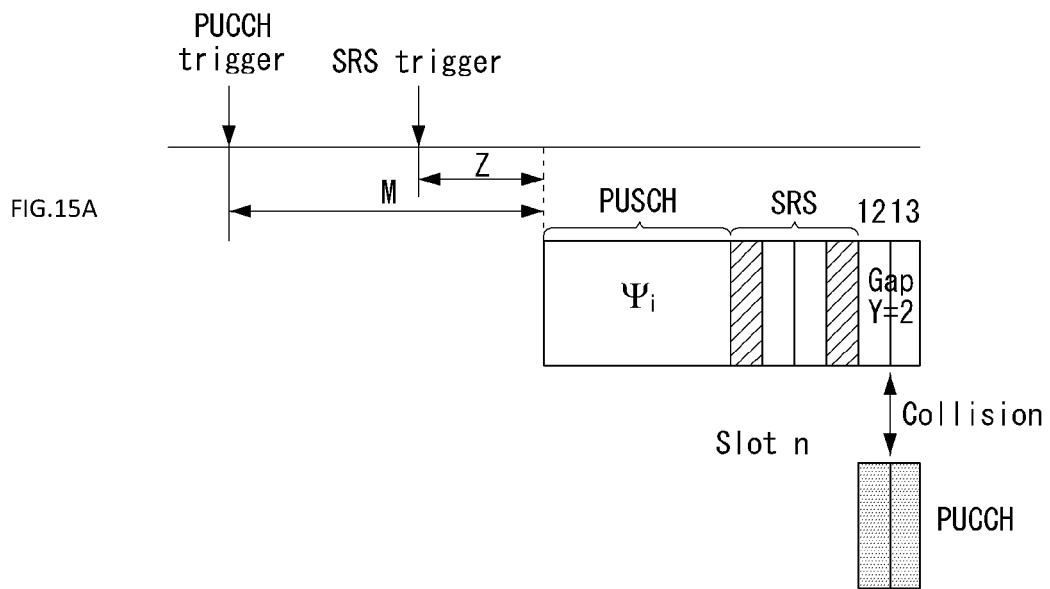
FIGS. 15A and 15B illustrate other examples of PUCCH transmission and SRS transmission to which methods as proposed in the disclosure may apply.
Figure 15B:
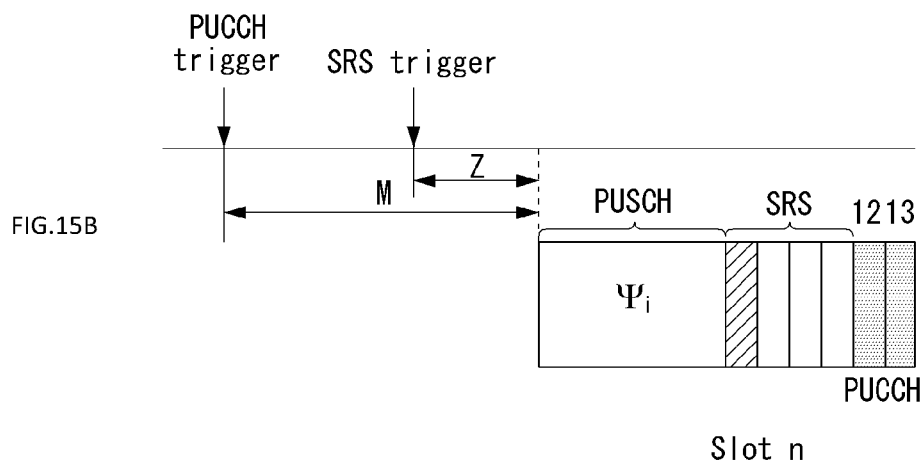

FIGS. 14A and 14B illustrate other examples of PUSCH transmission and SRS transmission to which methods as proposed in the disclosure may apply. FIGS. 14A and 14B is intended merely for illustration purposes but not for limiting the scope of the disclosure. Specifically, FIGS. 15A and 15B illustrate an example of configuring a guard period (i.e., Y symbols) for antenna switching with PUSCH and/or PUCCH upon SRS triggering and the SRS beam.

Referring to FIGS. 14A and 14B, it is assumed that in the configuration for Y symbols, the Y symbol start position index is 8 or 12 and, as numerology (i.e., subcarrier spacing) is 120 kHz, the number of Y symbols is 2.

FIG. 14A illustrates an example method of designating beam(s) $\Psi_k$ for transmission of SRS allocated after Y symbols (i.e., guard period) via SRI and/or TPMI included in DCI where the base station triggers SRS. In other words, FIG. 14A illustrates an example SRI and/or TPMI transmission method of SRS triggering DCI considering PUSCH ahead of SRS resource(s).

FIG. 14B illustrates an example method of designating beam(s) $\Psi_k$ for transmission of SRS considering PUCCH and/or PUSCH after Y symbols via SRI and/or TPMI included in the DCI where the base station triggers SRS. In other words, FIG. 14B illustrates an example SRI and/or TPMI transmission method of SRS triggering DCI considering PUCCH and/or PUSCH behind SRS resource(s).

Method 1-3)

In method 1-3), methods of addressing an overlap (i.e., collision) in position between Y symbols and other uplink transmission (e.g., PUCCH transmission) are described.

(Method 1-3a)

A first method to be considered is to define SRS resource(s) and Y symbols in one SRS resource group and define and/or apply a priority rule between the SRS resource group and PUCCH.

In NR systems, if a collision occurs between SRS and PUCCH (e.g., short PUCCH (sPUCCH)) for channel state information (CSI) reporting and/or beam failure recover request, either may be transmitted while the other may be dropped depending on the priority shown in Table 9 below.

TABLE 9

| | Aperiodic SRS | Semi-persistent SRS | periodic SRS |
|---|---|---|---|
| sPUCCH with aperiodic CSI report only | No rule** | sPUCCH | sPUCCH |
| sPUCCH with semi persistent CSI report only | SRS | sPUCCH | sPUCCH |
| sPUCCH with periodic CSI report only | SRS | sPUCCH | sPUCCH |
| sPUCCH with beam failure recover request* | sPUCCH | sPUCCH | sPUCCH |

If SRS drops in Table 9, the dropping may partially be carried out in the time domain. In other words, among OFDM symbols for SRS, only OFDM symbols colliding with sPUCCH may be dropped.

If sPUCCH supports a beam failure recover request, and collision between sPUCCH and aperiodic/semi-persistent/periodic SRS occurs, then sPUCCH may have priority. Further, the UE may assume that no collision occurs between aperiodic SRS and sPUCCH only for aperiodic CSI reporting.

A method that may be considered at this time is to regard Y symbols, together with their adjacent SRS resource(s), as being in one group (i.e., regards {SRS resource(s)+Y symbols}, instead of SRS, as in one SRS group) as described above and likewise apply the priority rule of Table 9. The group may be denoted an SRS group or SRS resource group.

In other words, if a guard period, i.e., Y symbols, is configured in relation to SRS resource(s), a priority rule between Y symbols and other uplink transmission (e.g., sPUCCH transmission) may be configured to be the same as the priority rule between the SRS resource(s) and the other uplink transmission. That is, referring to Table 9, the priority rule between Y symbols and PUCCH may be configured as shown in Table 10 below/

TABLE 10

|  | Y symbol for Aperiodic SRS | Y symbol for Semi-persistent SRS | Y symbol for periodic SRS |
| --- | --- | --- | --- |
| sPUCCH with aperiodic CSI report only | No rule** | sPUCCH | sPUCCH |
| sPUCCH with semi persistent CSI report only | Y symbol | sPUCCH | sPUCCH |
| sPUCCH with periodic CSI report only | Y symbol | sPUCCH | sPUCCH |
| sPUCCH with beam failure recover request* | sPUCCH | sPUCCH | sPUCCH |

In such a case, the SRS group (i.e., SRS resource(s) and Y symbol gap) may be determined or configured by explicit or implicit configuration.

For example, as a method of the explicit configuration, a configuration of Y symbols may be included in the SRS resource configuration (e.g., SRS-Config, SRS resource set config). This may mean that the SRS resource(s) and Y symbols included in the SRS resource configuration are configured in one SRS group.

As another example, if, as the implicit configuration method, the SRS resource(s) of the Y symbols and the SRS resource(s) are positioned in earlier symbols in the slot, the SRS resource(s) and the Y symbols that follow in order may be regarded as a single SRS group. If the Y symbols of the Y symbols and the SRS resource(s) are positioned in earlier symbols, the Y symbols and the SRS resource(s) that follow in order may be regarded as a single SRS group. At this time, each SRS group is supposed to include at least one SRS resource but may not include Y symbols. As an example, symbols subsequent to the last SRS resource(s) may not need Y symbols, which may not be configured accordingly.

(Method 1-3b)
And/or, if PUCCH and Y symbols collide in position, the UE may be configured to drop the SRS symbol (i.e., SRS resource(s)), which are positioned before the Y symbols, and the Y symbols and transmit the PUCCH. In other words, an SRS group may be configured and/or regarded in a similar manner as method 1-3a) described above, and the UE may be configured to drop the SRS group instead of applying the priority rule (e.g., Tables 9 and 10).

(Method 1-3c)
And/or, if PUCCH and Y symbols collide in position, the UE may be configured to drop PUCCH. In other words, an SRS group may be configured and/or regarded in a similar manner as method 1-3a) described above, and the UE may be configured to drop the PUCCH instead of applying the priority rule (e.g., Tables 9 and 10).

(Method 1-3d)
And/or, the UE may be configured not to expect collision between the PUCCH and Y symbols.

FIGS. 15A and 15B illustrate other examples of PUCCH transmission and SRS transmission to which methods as proposed in the disclosure may apply. FIGS. 15A and 15B are intended merely for illustration purposes but not for limiting the scope of the disclosure.

Referring to FIGS. 15A and 15B, it is assumed that in the configuration for Y symbols, the Y symbol start position index is 12 and, as numerology (i.e., subcarrier spacing) is 120 kHz, the number of Y symbols is 2 (e.g., G_SRS=13 in Table 6).

As shown in FIG. 15A, if the relationship between PUCCH triggering offset M and SRS triggering offset Z meets Z<M, and PUCCH symbol is transmitted in symbol indexes #12 and #13, and SRS symbols are set with symbol indexes #8 to #11, PUCCH symbol and Y symbols (i.e., gap symbol, guard period) may collide with each other.

In this case, the SRS symbol allocated before the Y symbols, and the Y symbols may be dropped, and PUCCH may be allocated to symbol indexes #12 and #13. This may be represented as shown in FIG. 15B.

Method 1-4)
The above-described method 1-3) proposes a scheme for addressing collision between PUCCH and Y symbols. In method 1-4), operations of the base station and/or UE when PUSCH and Y symbols (i.e., gap symbol) collide in position are described.

First, the UE may be configured to puncture the colliding Y symbols.

Or, the UE may be configured to perform rate matching considering the colliding Y symbols. However, upon UL grant transmission, the base station may indicate, to the UE, allocation of UL data for which rate matching has already been considered on the slot (i.e., the slot where PUSCH and Y symbols collide).

Or, the UE may shift the positions of SRS symbols to next symbol positions by the number of the colliding Y symbols. For example, if the number of Y symbols is 2, and SRS symbol position indexes are #8 to #11, the UE may shift the SRS symbol positions to symbol indexes #10 to #13. However, upon SRS triggering, the base station may recognize collision between the Y symbols and the PUSCH symbols in the slot. In other words, the base station may recognize that the SRS is shifted by the number of Y symbols in the slot.

Or, the UE may be configured not to expect collision between the PUSCH symbols and Y symbols.

Method 2)
Where no separate Y symbols (i.e., guard period, gap symbol) are predefined or configured between the base station and/or the UE as in method 1 described above, operations of the base station and/or UE to configure and/or determine Y symbols are described.

As a method to be considered when no separate Y symbols are predefined or configured between the base station and/or the UE, the UE may determine Y symbols.

If Y symbols are determined by the UE, and a collision occurs between PUSCH and SRS resource(s) (or SRS group configured of SRS resource(s) and Y symbols), the UE may be configured to perform operations similar to the above-described method 1. Specifically, the following example UE operations may be taken into consideration.

For example, regardless of other operations, the UE may be configured to report (or feedback) a configuration for Y symbols (i.e., a configuration of Y symbol gap) to the base station. A signaling scheme available in this case may be used similar to the scheme described in method 1).

As another example, if the UE rate-matches PUSCH considering Y symbols, the UE may be configured to report rate matching-related information to the base station. As an example, the rate matching-related information may include, e.g., whether rate matching is performed and a value for the Y symbols (e.g., a configuration for the Y symbols).

If the UE transmits the rate matching-related information via PUSCH, the transmission may be performed, with encoding independent from PUSCH applied to the p symbol which is ahead of the PUSCH.

Further, as a feedback method, the UE may transmit an MCS value considering rate matching via PUCCH or PUSCH. Or, the UE may perform transmission while maintaining the MCS indicated by the base station, and the UE may transmit flag information (on/off) indicating whether to perform rate matching.

As another example, the UE may shift the SRS and/or PUSCH symbol positions, by the number of colliding Y symbols, in the opposite direction of the opposite channel (e.g., SRS or PUSCH) and report (i.e., feedback) information for the number of the shifted symbols via PUSCH and/or PUCCH.

As another example, the UE may puncture and transmit PUSCH symbols that collide with the Y symbols. In other words, the UE may puncture the PUSCH symbols that overlap the Y symbols and transmit the SRS and PUSCH. In this case, the UE may refrain from additional feedback to the base station.

In the instant embodiment, the above-described Y symbols (i.e., guard period, gap symbol) may be configured and/or signaled differently between SRS and PUSCH and/or PUCCH. The PUCCH may be a short PUCCH (sPUCCH) (e.g., PUCCH format 0 or 2) or a long PUCCH (e.g., PUCCH format 1, 3, or 4). Further, the Y symbols may be designated to differ per UL bandwidth part (BWP).

Second Embodiment

A scheme of addressing collision (i.e., overlap) between guard period and other uplink transmission (e.g., PUSCH and/or PUCCH transmission) has been described above in connection with the first embodiment.

For reference, in NR systems, a transmission timing may be configured per SRS resource set. In other words, NR systems may further consider collision between SRS resource sets.

Described below are specific methods for addressing collision between the guard period and SRS resource set (i.e., SRS resources) according to an embodiment.

Method 1)

Y symbols may be configured per SRS resource set, and such configuration may be performed via high layer signaling (e.g., RRC signaling). If a collision occurs between SRS resource and Y symbols (i.e., guard period, gap symbol) belonging to different SRS resource sets in the same slot, the UE and/or base station may be operated as in the following methods.

First, the UE may not expect collision between the SRS resource sets. Further, the UE may not expect collision between SRS resource set and Y symbols either.

Or, the UE may drop the Y symbols configured by the base station according to the priority rule between the SRS resource set including the colliding SRS resource and the SRS including the Y symbols. Specific methods operated considering the priority rule are described below.

First, the UE may allocate the SRS resource included in the SRS resource set with a high priority to the slot and, if a configuration for Y symbols (i.e., guard period, gap symbol) is included in a configuration of the SRS resource set, the UE may be configured to empty the symbols, i.e., the Y symbols. Thus, among the other SRS resource sets colliding in the same slot, the SRS resource sets with a lower priority may be dropped, or only SRS resource(s) corresponding to the colliding symbols in the SRS resource set may be dropped.

Further, such a case is assumed that if a collision occurs between the Y symbols and specific SRS resources configured in different SRS resource sets in the (UL) slot, the colliding SRS resource has a higher priority over the Y symbols, or the SRS resource set in which the colliding SRS resource is configured has a higher priority over the SRS resource set in which the Y symbols are configured. In this case, the UE may be configured to allocate higher-priority SRS resources while dropping lower-priority Y symbols alone. Or, for the lower-priority SRS resource set, the UE may drop the entire SRS resource set including the Y symbols. Or, the UE may drop the SRS group (i.e., SRS resource(s) and Y symbols) including the lower-priority Y symbols.

Further, the SRS resources included in the SRS resource set for which the time of reception of DCI (i.e., DCI for aperiodic SRS triggering) including an aperiodic SRS trigger is earlier may be configured to have a higher priority over the Y symbols belonging to the slower SRS resource set. In contrast, the SRS resources included in the SRS resource set for which the time of reception of DCI (i.e., DCI for aperiodic SRS triggering) including an aperiodic SRS trigger is later may be configured to have a higher priority over the Y symbols belonging to the faster SRS resource set.

Further, if the SRS resources included in the aperiodic SRS resource set collide with the Y symbols configured in the periodic and/or semi-persistent SRS resource set, the UE may drop the entire aperiodic SRS resource set or only SRS resource symbol(s) colliding with the Y symbols. Or, if the Y symbols included in the aperiodic SRS resource set collide with the SRS resources configured in the periodic and/or semi-persistent SRS resource set, the UE may drop the entire periodic and/or semi-persistent SRS resource set or only SRS resource symbol(s) colliding with the Y symbols.

Further, a priority rule between the Y symbols and each SRS resource set may be defined depending on SRS resource set usage (e.g., RRC parameter SRS-SetUse, usage). For example, it is assumed that the priority rule is set to "Y symbols of SRS resource set for antenna switching (i.e., antenna switching-based SRS resource set)>SRS resource set for codebook (i.e., codebook-based SRS resource set)." In this case, since the Y symbols in the SRS resource set configuration for antenna switching have higher priority, if the SRS resource set for antenna switching and SRS resource set for codebook collide with each other in the slot, the UE may drop the SRS resource set for codebook or only colliding symbol(s).

Method 1-1)

SRS group (i.e., SRS resource group) may be defined as a configuration (i.e., N+K symbols) of all or some of the SRS resource(s) (e.g., N symbols) and Y symbols (e.g., K symbols). Or, SRS group (i.e., SRS resource group) may be defined as a configuration (i.e., M+K symbols) of M SRS symbols including the SRS resource(s) and Y symbols (e.g., K symbols).

Further, the Y symbols and SRS resource symbols in the SRS group may be positioned in the order of [SRS resource symbols (N), Y symbols (K)], [Y symbols (K), SRS resource symbols (N)], [SRS symbols (M), Y symbols (K)], or [Y symbols (K), SRS symbols (M)].

The above-described SRS group may be defined for consecutive symbols.

At this time, operations of the UE and/or base station when a collision occurs between the SRS groups are described. The operations of the UE depending on priority described below may be indicated or configured by the base station or may be predefined on the system.

First, the UE may allocate the SRS group with higher priority to uplink transmission while dropping only Y symbols configured in the SRS group with lower priority. Or, for the lower-priority SRS group, the UE may drop the entire SRS group including the Y symbols. Or, the UE may drop only SRS resources for which Y symbols have been configured in the lower-priority SRS group.

Further, the following example operations may be considered to configure a drop in the lower-priority SRS group.

For example, a parameter indicating the number of symbols (L<M+K or L<N+K) dropped in the SRS group may be configured via high layer signaling. In other words, the base station may transmit the parameter information indicating the number of symbols dropped in the SRS group to the UE via high layer signaling (e.g., RRC signaling). The order of symbol L dropped may be implicitly defined depending on the positions of Y symbols and SRS resource symbol(s) in the SRS group. As a specific example, when L=2, if the dropped SRS group is made up of four symbols indicating one Y symbol and one SRS resource, the UE may drop two symbols (n+1) in ascending order from the start symbol (n) in the SRS group. Or, if an SRS group is configured which is dropped in one symbol-gap after four SRS symbols indicating one SRS resource, the UE may drop prior two symbols (n−1) in descending order from the last symbol (n) in the SRS group.

Further, as another example, flag information (e.g., Drop_order_SRSresourceGroup) indicating the progress direction of symbols dropped in the SRS group may be configured via high layer signaling. In other words, the base station may transmit flag information indicating the progress direction of symbols dropped in the SRS group to the UE via high layer signaling. As a specific example, if Drop_order_SRSresourceGroup=0, the UE may sequentially drop the SRS group starting from the first symbol. In contrast, if Drop_order_SRSresourceGroup=1, the UE may sequentially drop the SRS group starting from the last symbol.

Method 1-2)

Further, the configured SRS group (i.e., SRS resource group) may be reconfigured according to the relationship between the UE's PUCCH and/or PUSCH resources, and/or collision with SRS resource (and/or SRS resource set). The reconfiguration for the structure of the SRS group may be configured by the base station or, upon collision, may be implicitly configured by the UE.

The base station and/or UE may configure a reconfiguration method for the structure of SRS group via high layer signaling. Or, if a PUCCH configuration (e.g., DCI) with a higher priority than PUSCH is transferred at a time earlier than the SRS triggering time, configuration information for the SRS group may be transmitted via the DCI. Or, the UE may perform reconfiguration on the SRS group structure and transmit (or report) information for the changed SRS group structure to the base station.

At this time, the SRS resource(s) in the SRS group allocated to the PUSCH region may be dropped. Such operation type may be predefined, determined, or agreed on between the base station and/or the UE.

Or, the UE may transmit feedback information representing (or indicating) a variation in the structure of the SRS group to the base station via PUSCH and/or PUCCH. The structure information for the changed SRS group may include, e.g., position of Y symbols and position of SRS resource symbol. Further, candidates for SRS group structure may be configured via high layer signaling (e.g., RRC signaling), and the corresponding indexes may be transmitted via uplink control information (UCI).

Figure 16A:
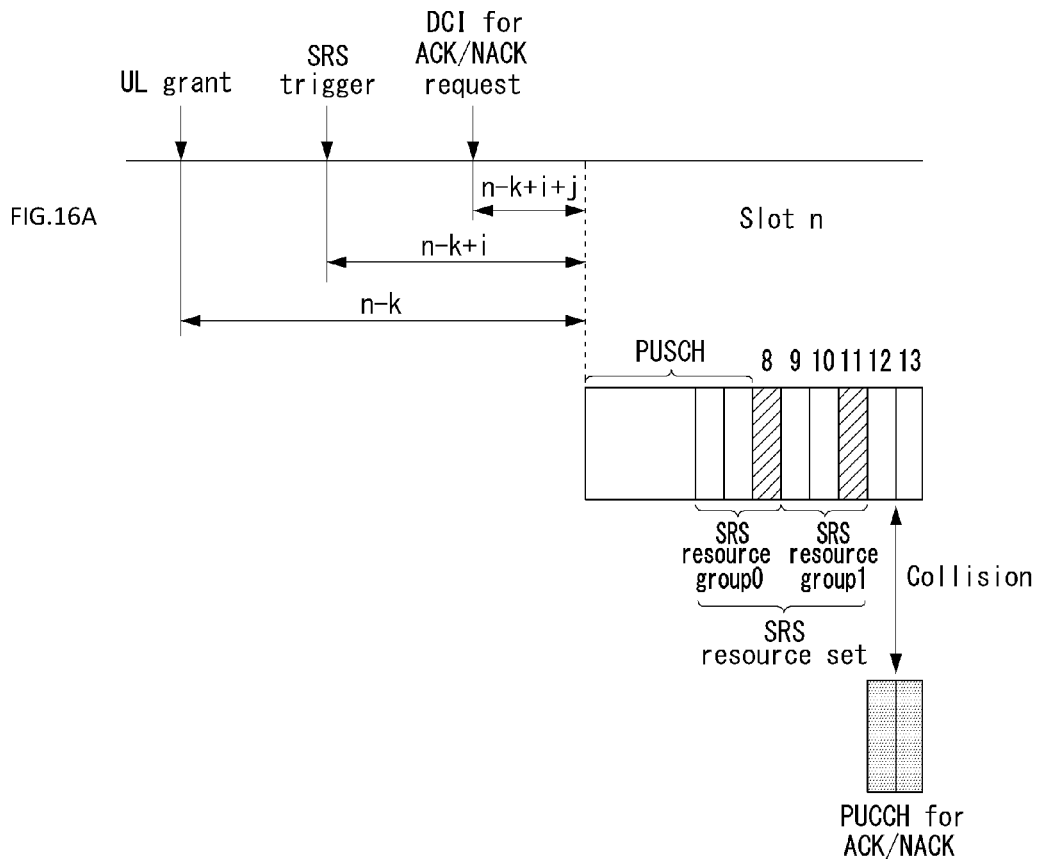
FIGS. 16A and 16B illustrate examples of PUSCH transmission, PUCCH transmission, and SRS transmission to which methods as proposed in the disclosure may apply.
Figure 16B:
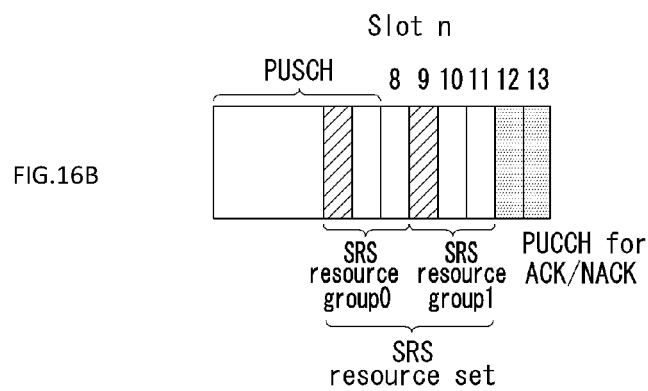

FIGS. 16A and 16B illustrate examples of PUSCH transmission, PUCCH transmission, and SRS transmission to which methods as proposed in the disclosure may apply. FIGS. 16A and 16B are intended merely for illustration purposes but not for limiting the scope of the disclosure.

Referring to FIGS. 16A and 16B, an SRS resource set consists of two SRS resource groups (SRS resource group 0 and SRS resource group 1) and, as numerology (i.e., subcarrier spacing) is 120 kHz, the number of Y symbols, i.e., the number of gap symbols, is assumed to be 2.

Further, k may mean the timing offset between UL grant and PUSCH transmission, i may mean the timing offset between SRS triggering DCI and SRS transmission, and j may mean the timing offset between DCI for PUCCH transmission (e.g., DCI for ACK/NACK request) and PUCCH transmission.

As shown in FIG. 16A, the UE may receive a UL grant for PUSCH transmission at time n (i.e., nth slot) from the base station and may receive an aperiodic SRS trigger (i.e., aperiodic SRS triggering DCI) indicating SRS transmission at the same time from the base station at time n−k+i (k>i). At this time, the configuration of the first SRS group (i.e., SRS resource group 0) may be configured so that the Y symbols (i.e., gap symbols) are allocated to two symbols (symbol indexes #6 and #7), and the SRS resource is allocated to symbol index #8. Further, the second SRS group (i.e., SRS resource group 1) of a similar structure may be configured consecutively from the first SRS group. Like the first SRS group, the second SRS group is constituted of two Y symbol and one SRS resource, in which changes have been made only to symbol positions in the slot.

However, such an occasion may arise where the UE receives scheduling DCI of PUCCH transmission for HARQ ACK/NACK (A/N) transmissions for PDSCH reception at the n−k+i+j time (k>i+j) and PUCCH transmission is required at the same n time. In this case, the UE may switch between the front/end of the SRS group as shown in FIG. 16B. In other words, the UE may be configured to allocate the SRS resource of the SRS group to symbol index #6 and Y symbols to symbol indexes #7 and #8 and perform PUSCH, SRS, and/or PUCCH transmission.

Method 2)

As set forth above, if a collision occurs between the Y symbols and SRS resource set, the colliding SRS resource set may be configured to be transmitted in the next slot (i.e., UL slot), a different SRS transmission slot, or after K slots. For example, if a collision occurs in the nth slot, the UE may be configured to transmit the SRS resource in the n+Kth slot.

Here, parameter information (e.g., K) for transmission timing of SRS resource set may be preset or defined between the base station and/or UE or may be set by high layer signaling (e.g., RRC signaling).

Method 3)

Further, unlike the above-described method 2, if a collision occurs between the Y symbols of the SRS resource set(s), which have a configuration for Y symbols, among the SRS resource set(s) configured in one slot and other SRS resource set(s), the UE may be configured to transmit the SRS resource set including the Y symbols in the next slot (i.e., UL slot), next SRS transmission slot, or after K slots.

At this time, parameter information (e.g., K) for transmission timing of SRS resource set which has the Y symbol configuration may be preset or defined between the base station and/or UE or may be set by high layer signaling (e.g., RRC signaling). In other words, the parameter information may be configured in the SRS setting or SRS resource set configuration (e.g., SRS resource set of SRS-Config).

By the above-described collision, the transmission position (i.e., transmission symbol position) of SRS resource set transmitted in the next slot may be configured for the UE and/or base station via high layer signaling.

Further, if the SRS resource set which has been varied (i.e., shifted) due to collision collides again with other channel and/or signal(s) (e.g. reference signal) in the slot, the UE may drop the entire SRS resource set or drop SRS transmission only for the colliding symbols. Or, in this case, the UE may perform uplink transmission according to a priority rule between the colliding SRS resource set and other channel and/or signal(s). As an example, if the SRS resource set has a higher priority over the other channel and/or signal, the UE may perform (or allocate) SRS transmission and, if the SRS resource set has a lower priority over the other channel and/or signal, the UE may drop the SRS transmission. Or, the UE may be configured not to expect a collision between the SRS resource set which has been varied (i.e., shifted) due to collision and other channel and/or signal(s).

By the above-described methods proposed in the disclosure, it is possible to reduce performance deterioration due to antenna switching distortion upon UL transmission (e.g., PUSCH or PUCCH). Specifically, it is possible to efficiently configure symbols (i.e., the above-described Y symbols) for preventing mismatching in UE transmission beam between SRS resource and PUSCH or PUCCH positioned before or behind the SRS resource according to SRS antenna switching upon SRS antenna switching in NR systems.

Figure 17:
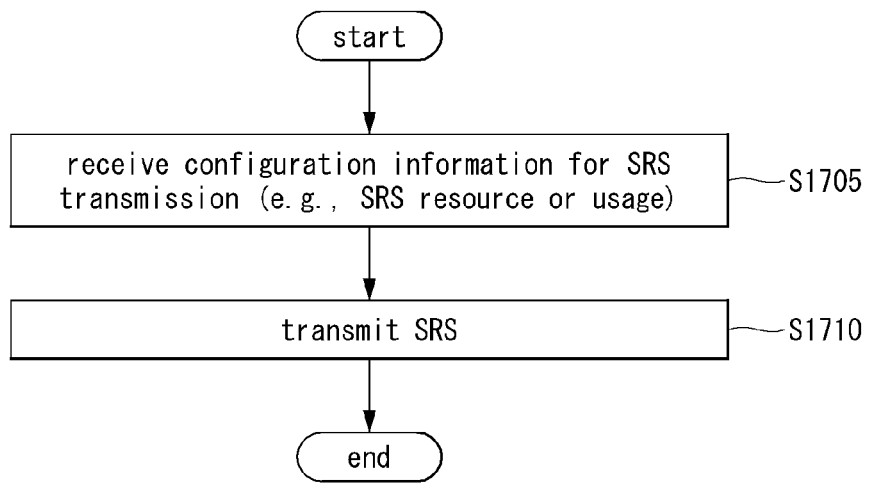
FIG. 17 is a flowchart illustrating example operations of a UE performing SRS transmission in a wireless communication system to which methods as proposed in the disclosure may apply.

FIG. 17 is a flowchart illustrating example operations of a UE performing SRS transmission in a wireless communication system to which methods as proposed in the disclosure may apply. FIG. 17 is intended merely for illustration purposes but not for limiting the scope of the disclosure.

Referring to FIG. 17, it is assumed that the UE and/or base station transmits/receives SRS based on the above-described embodiments and methods in the disclosure. In particular, the UE and/or base station may perform SRS transmission considering collision between SRS and/or Y symbols and other uplink transmission, given a priority rule (e.g., Table 10) as proposed in the disclosure.

First, the UE may receive configuration information (e.g., SRS_Config) for SRS transmission from the base station (S1705). As an example, the configuration information may include one or more SRS resources for SRS transmission and information for usage of one or more SRS resources.

Thereafter, the UE may perform SRS transmission to the base station using the one or more resources (S1710).

At this time, a guard period (e.g., the above-described Y symbols) related to the one or more SRS resources may be configured. As an example, the guard period may be configured between SRS resources, and the position of the guard period may be configured by the base station and/or UE. Thus, the guard period may be positioned between the SRS resources or between the SRS resources and other uplink channels.

If the guard period overlaps transmission of a specific uplink channel configured for the UE, the priority between the guard period and the specific uplink channel (e.g., Table 10 described above) may be set to be identical to the priority (e.g., Table 9 described above) between the SRS and the specific uplink channel. As an example, the priority rule between the Y symbols and PUCCH (in particular, sPUCCH) may follow the priority rule between SRS and PUCCH (in particular, sPUCCH). Here, the (s)PUCCH may be an (s)PUCCH for CSI reporting or beam failure recover request. When the (s)PUCCH is configured for the beam failure recovery, a guard period and a SRS resource overlapped with the (s)PUCCH may be dropped.

Further, when the usage is configured to an antenna switching, the guard period may be configured for the antenna switching.

Further, the number of symbols of the guard period may be configured by considering a subcarrier spacing (i.e., numerology) which is configured for the transmission of the SRS. As an example, the Y symbols may be configured as one symbol or two symbols depending on numerology.

Further, the configuration information for the guard period may be configured per SRS resource set via, e.g., high layer signaling. As an example, the configuration information for the guard period may include a starting position index of the guard period, the number of symbols of the guard period, and/or information for whether the guard period is configured between the transmission of the SRS and a transmission of another uplink channel adjacent thereto.

Further, when the guard period is not configured, the UE may be configured to perform an uplink transmission prior to the guard period and an uplink transmission after the guard period, using the same transmission beam (and/or antenna port). For example, as shown in FIG. 13 or 14, the same transmission beam W, may be used for transmission of PUSCH and SRS adjacent to each other. In this case, the above-described transmission beam may be indicated by the SRS resource indicator (SRI) and/or transmission precoder matrix indicator (TPMI).

Figure 19:
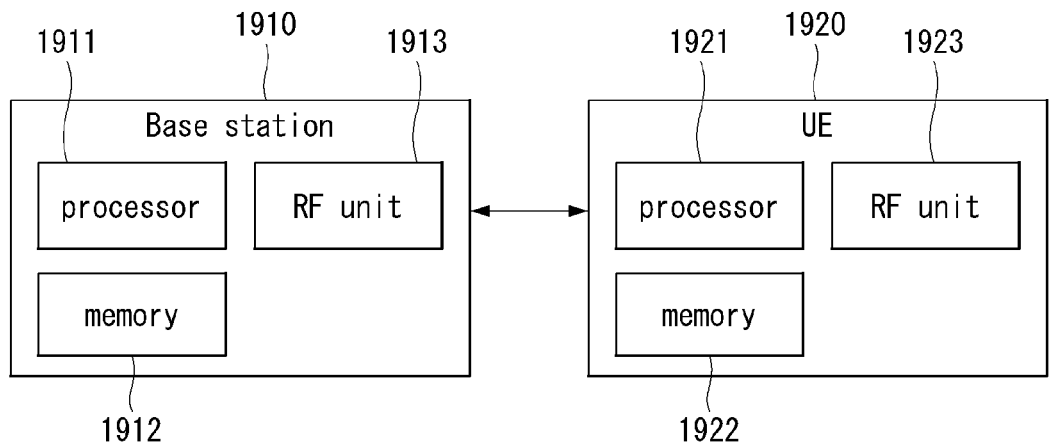
FIG. 19 is a block diagram illustrating a configuration of a wireless communication device to which methods proposed according to the disclosure are applicable.
Figure 20:
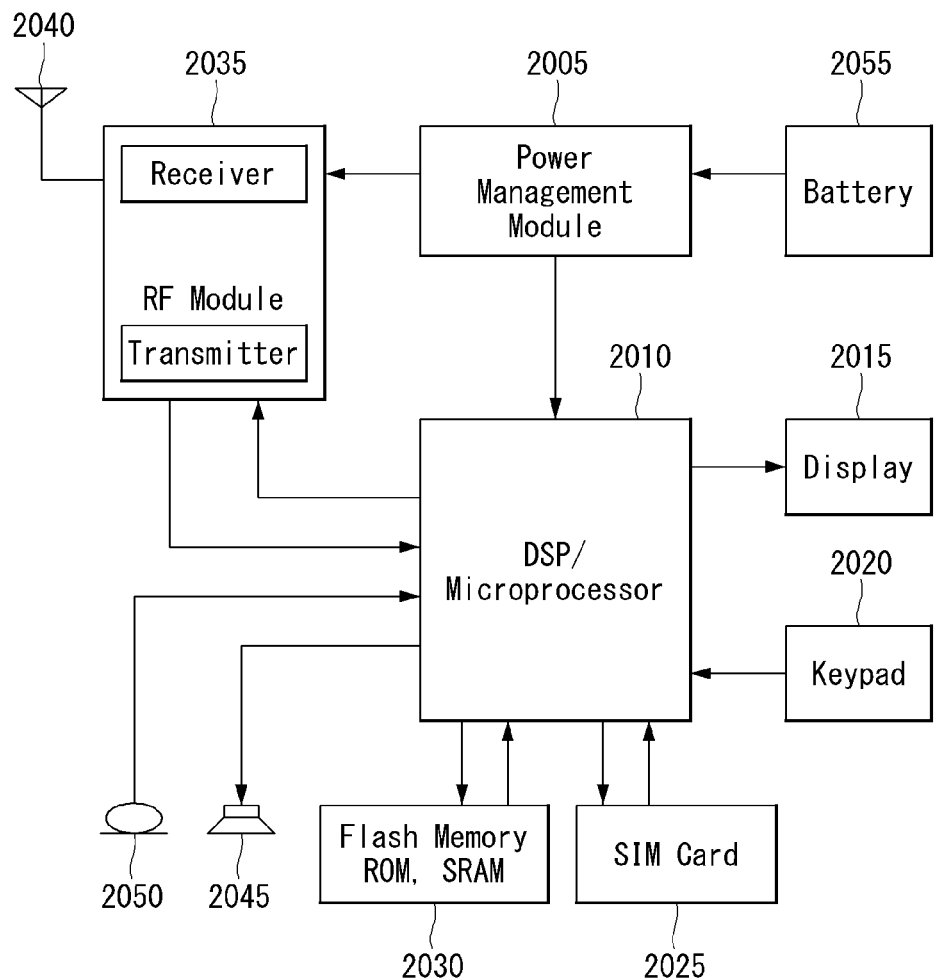
FIG. 20 is a block diagram illustrating a configuration of a communication device according to an embodiment of the disclosure.

In connection with this, the above-described UE operations may be specifically implemented by the UE 1920 shown in FIGS. 19 and 20. For example, the above-described UE operations may be performed by the processors 1921 and 2010 and/or the RF units (or modules) 1923 and 2035.

First, the processors 1921 and 2010 may control the RF units (or modules) 1923 and 2035 to receive configuration information (e.g., SRS_Config) for transmission of SRS from the base station 1910 (S1705). As an example, the configuration information may include one or more SRS resources for SRS transmission and information for usage of one or more SRS resources.

Thereafter, the processors 1921 and 2010 may control the RF units (or modules) 1923 and 2035 to perform SRS transmission to the base station 1910 using the one or more resources (S1710).

At this time, a guard period (e.g., the above-described Y symbols) related to the one or more SRS resources may be configured. As an example, the guard period may be configured between SRS resources, and the position of the guard period may be configured by the base station and/or UE. Thus, the guard period may be positioned between the SRS resources or between the SRS resources and other uplink channels.

If the guard period overlaps transmission of a specific uplink channel configured for the UE, the priority between the guard period and the specific uplink channel (e.g., Table 10 described above) may be set to be identical to the priority (e.g., Table 9 described above) between the SRS and the specific uplink channel. As an example, the priority rule between the Y symbols and PUCCH (in particular, sPUCCH) may follow the priority rule between SRS and PUCCH (in particular, sPUCCH). Here, the (s)PUCCH may be an (s)PUCCH for CSI reporting or beam failure recover request. When the (s)PUCCH is configured for the beam failure recovery, a guard period and a SRS resource overlapped with the (s)PUCCH may be dropped.

Further, when the usage is configured to an antenna switching, the guard period may be configured for the antenna switching.

Further, the number of symbols of the guard period may be configured by considering a subcarrier spacing (i.e., numerology) which is configured for the transmission of the SRS. As an example, the Y symbols may be configured as one symbol or two symbols depending on numerology.

Further, the configuration information for the guard period may be configured per SRS resource set via, e.g., high layer signaling. As an example, the configuration information for the guard period may include a starting position index of the guard period, the number of symbols of the guard period, and/or information for whether the guard period is configured between the transmission of the SRS and a transmission of another uplink channel adjacent thereto.

Further, when the guard period is not configured, the UE may be configured to perform an uplink transmission prior to the guard period and an uplink transmission after the guard period, using the same transmission beam (and/or antenna port). For example, as shown in FIG. 13 or 14, the same transmission beam W, may be used for transmission of PUSCH and SRS adjacent to each other. In this case, the above-described transmission beam may be indicated by the SRS resource indicator (SRI) and/or transmission precoder matrix indicator (TPMI).

Figure 18:
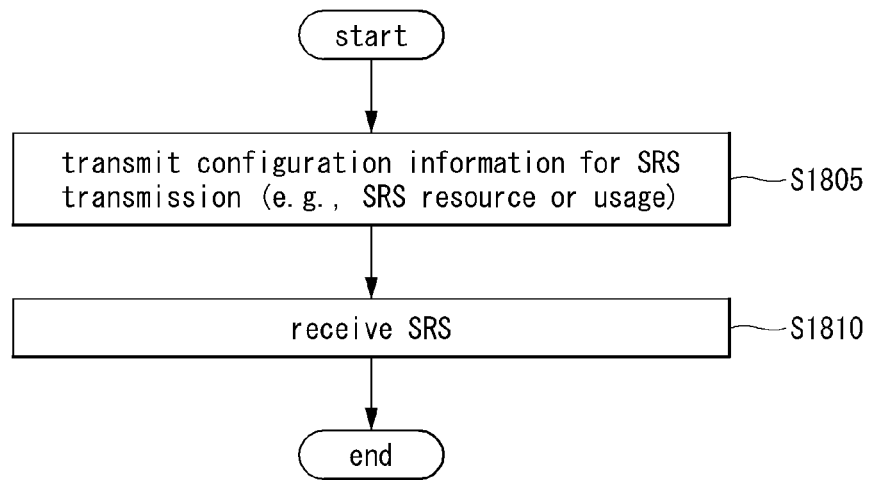
FIG. 18 is a flowchart illustrating example operations of a base station performing SRS reception in a wireless communication system to which methods as proposed in the disclosure may apply.

FIG. 18 is a flowchart illustrating example operations of a base station performing SRS reception in a wireless communication system to which methods as proposed in the disclosure may apply. FIG. 18 is intended merely for illustration purposes but not for limiting the scope of the disclosure.

Referring to FIG. 18, it is assumed that the UE and/or base station transmits/receives SRS based on the above-described embodiments and methods in the disclosure. In particular, the UE and/or base station may perform SRS transmission considering collision between SRS and/or Y symbols and other uplink transmission, given a priority rule (e.g., Table 10) as proposed in the disclosure.

First, the base station may transmit configuration information (e.g., SRS_Config) for SRS transmission to the UE (S1805). As an example, the configuration information may include one or more SRS resources for SRS transmission and information for usage of one or more SRS resources.

Thereafter, the base station may perform SRS reception from the UE using the one or more resources (S1810).

At this time, a guard period (e.g., the above-described Y symbols) related to the one or more SRS resources may be configured. As an example, the guard period may be configured between SRS resources, and the position of the guard period may be configured by the base station and/or UE. Thus, the guard period may be positioned between the SRS resources or between the SRS resources and other uplink channels.

If the guard period overlaps transmission of a specific uplink channel configured for the UE, the priority between the guard period and the specific uplink channel (e.g., Table 10 described above) may be set to be identical to the priority (e.g., Table 9 described above) between the SRS and the specific uplink channel. As an example, the priority rule between the Y symbols and PUCCH (in particular, sPUCCH) may follow the priority rule between SRS and PUCCH (in particular, sPUCCH). Here, the (s)PUCCH may be an (s)PUCCH for CSI reporting or beam failure recover request. When the (s)PUCCH is configured for the beam failure recovery, a guard period and a SRS resource overlapped with the (s)PUCCH may be dropped.

Further, when the usage is configured to an antenna switching, the guard period may be configured for the antenna switching.

Further, the number of symbols of the guard period may be configured by considering a subcarrier spacing (i.e., numerology) which is configured for the transmission of the SRS. As an example, the Y symbols may be configured as one symbol or two symbols depending on numerology.

Further, the configuration information for the guard period may be configured per SRS resource set via, e.g., high layer signaling. As an example, the configuration information for the guard period may include a starting position index of the guard period, the number of symbols of the guard period, and/or information for whether the guard period is configured between the transmission of the SRS and a transmission of another uplink channel adjacent thereto.

Further, when the guard period is not configured, the UE may be configured to perform an uplink transmission prior to the guard period and an uplink transmission after the guard period, using the same transmission beam (and/or antenna port). For example, as shown in FIG. 13 or 14, the same transmission beam W, may be used for transmission of PUSCH and SRS adjacent to each other. In this case, the above-described transmission beam may be indicated by the SRS resource indicator (SRI) and/or transmission precoder matrix indicator (TPMI).

In connection with this, the above-described base station operations may be specifically implemented by the base station 1910 shown in FIG. 19. For example, the above-described base station operations may be performed by the processor 1911 and/or the RF unit (or module) 1913.

First, the processor 1911 may control the RF unit (or module) 1913 to transmit configuration information (e.g., SRS_Config) for transmission of SRS to the UE 1920 (S1805). As an example, the configuration information may include one or more SRS resources for SRS transmission and information for usage of one or more SRS resources.

Thereafter, the processor 1911 may control the RF unit (or module) 1913 to perform SRS reception from the UE 1920 using the one or more resources (S1810).

At this time, a guard period (e.g., the above-described Y symbols) related to the one or more SRS resources may be configured. As an example, the guard period may be configured between SRS resources, and the position of the guard period may be configured by the base station and/or UE. Thus, the guard period may be positioned between the SRS resources or between the SRS resources and other uplink channels.

If the guard period overlaps transmission of a specific uplink channel configured for the UE, the priority between the guard period and the specific uplink channel (e.g., Table 10 described above) may be set to be identical to the priority (e.g., Table 9 described above) between the SRS and the specific uplink channel. As an example, the priority rule between the Y symbols and PUCCH (in particular, sPUCCH) may follow the priority rule between SRS and PUCCH (in particular, sPUCCH). Here, the (s)PUCCH may be an (s)PUCCH for CSI reporting or beam failure recover request. When the (s)PUCCH is configured for the beam failure recovery, a guard period and a SRS resource overlapped with the (s)PUCCH may be dropped.

Further, when the usage is configured to an antenna switching, the guard period may be configured for the antenna switching.

Further, the number of symbols of the guard period may be configured by considering a subcarrier spacing (i.e., numerology) which is configured for the transmission of the SRS. As an example, the Y symbols may be configured as one symbol or two symbols depending on numerology.

Further, the configuration information for the guard period may be configured per SRS resource set via, e.g., high layer signaling. As an example, the configuration information for the guard period may include a starting position index of the guard period, the number of symbols of the guard period, and/or information for whether the guard period is configured between the transmission of the SRS and a transmission of another uplink channel adjacent thereto.

Further, when the guard period is not configured, the UE may be configured to perform an uplink transmission prior to the guard period and an uplink transmission after the guard period, using the same transmission beam (and/or antenna port). For example, as shown in FIG. 13 or 14, the same transmission beam W, may be used for transmission of PUSCH and SRS adjacent to each other. In this case, the above-described transmission beam may be indicated by the SRS resource indicator (SRI) and/or transmission precoder matrix indicator (TPMI).

The operations proposed in the disclosure may apply likewise where component carrier (CC) hopping is performed on SRS transmission and a collision occurs between the Y symbols (i.e., gap symbol) and the SRS resource set and/or other uplink transmission (e.g., PUSCH or PUCCH) configured in different CCs, in particular, intra-band CCs.

Further, the methods proposed in the disclosure may be applied alone or in combination.

Although the methods proposed in the disclosure have been described based on 3GPP LTE system and NR system for ease of description, the methods are also applicable to other systems, in particular, 5G and its candidate technology, as well as to 3GPP LTE and NR systems.

Devices to which the Present Disclosure may Apply

FIG. 19 is a block diagram illustrating a configuration of a wireless communication device to which methods proposed according to the disclosure are applicable.

Referring to FIG. 19, a wireless communication system includes a base station 1910 and a plurality of UEs 1920 positioned in the coverage of the base station 1910.

The base station 1910 includes a processor 1911, a memory 1912, and a radio frequency (RF) unit 1913. The processor 1911 implements the functions, processes or steps, and/or methods proposed above in connection with FIGS. 1 to 18. Wireless interface protocol layers may be implemented by the processor 1911. The memory 1912 is connected with the processor 1911 to store various pieces of information for driving the processor 1911. The RF unit 1913 is connected with the processor 1911 to transmit and/or receive wireless signals.

The UE 1920 includes a processor 1921, a memory 1922, and an RF unit 1923.

The processor 1921 implements the functions, processes or steps, and/or methods proposed above in connection with FIGS. 1 to 18. Wireless interface protocol layers may be implemented by the processor 1921. The memory 1922 is connected with the processor 1921 to store various pieces of information for driving the processor 1921. The RF unit 1923 is connected with the processor 1921 to transmit and/or receive wireless signals.

The memory 1912 and 1922 may be positioned inside or outside the processor 1911 and 1921 and be connected with the processor 1911 and 1921 via various known means.

As an example, to transmit/receive downlink (DL) data in a wireless communication system supporting low-latency service, the UE may include a radio frequency (RF) unit for transmitting/receiving radio signals and a processor functionally connected with the RF unit.

The base station 1910 and/or the UE 1920 may include a single or multiple antennas.

FIG. 20 is a block diagram illustrating a configuration of a communication device according to an embodiment of the disclosure.

In particular, FIG. 20 illustrates in greater detail the UE of FIG. 19.

Referring to FIG. 20, the UE may include a processor (or a digital signal processor (DSP)) 2010, an RF module (or RF unit) 2035, a power management module 2005, an antenna 2040, a battery 2055, a display 2015, a keypad 2020, a memory 2030, a subscriber identification module (SIM) card 2025 (which is optional), a speaker 2045, and a microphone 2050. The UE may include a single or multiple antennas.

The processor 2010 implements the functions, processes or steps, and/or methods proposed above in connection with FIGS. 1 to 18. Wireless interface protocol layers may be implemented by the processor 2010.

The memory 2030 is connected with the processor 2010 to store information related to the operation of the processor 2010. The memory 2030 may be positioned inside or outside the processor 2010 and be connected with the processor 2010 via various known means.

For example, the user inputs instruction information, e.g., a phone number, by voice activation using the microphone 2050 or by pressing (or touching) a button of the keypad 2020. The processor 2010 receives the instruction information and handles performing a proper function, e.g., calling at the phone number. Operational data may be extracted from the SIM card 2025 or the memory 2030. Further, the processor 2010 may display the instruction information or operational information on the display 2015 for convenience or user's recognition.

The RF module 2035 is connected with the processor 2010 to transmit and/or receive RF signals. The processor 2010 transfers instruction information to the RF module 2035 to initiate communication, e.g., to transmit a wireless signal constituting voice communication data. The RF module 2035 includes a receiver and a transmitter for receiving and transmitting wireless signals. The antenna 2040 functions to transmit and receive wireless signals. Upon receiving a wireless signal, the RF module 2035 transfers the signal for processing by the processor 2010 and convert the signal into a base-band signal. The processed signal may be converted into readable or audible information output via the speaker 2045.

Figure 21:
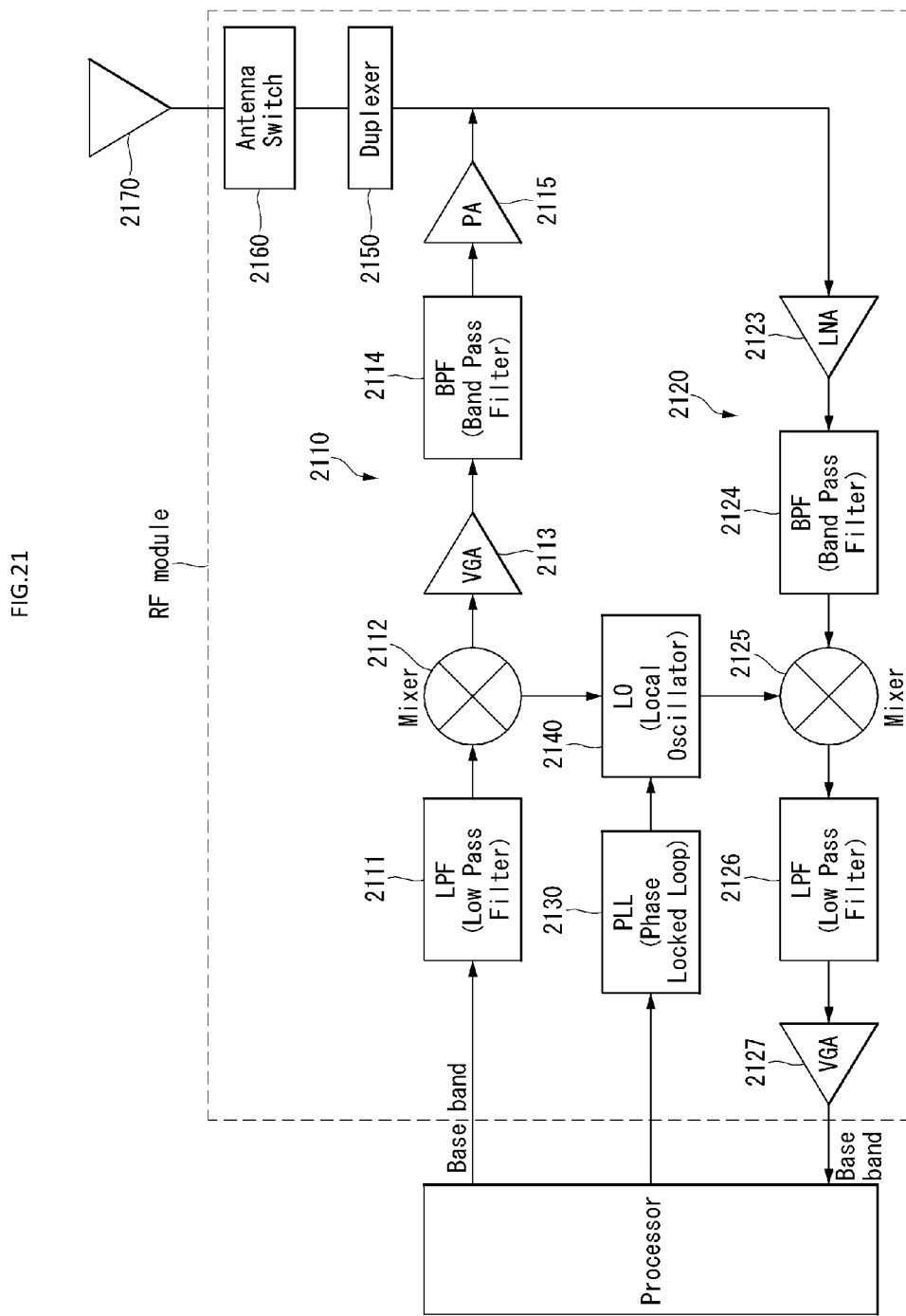
FIG. 21 is a view illustrating an example RF module of a wireless communication device to which methods as proposed herein are applicable.

FIG. 21 is a view illustrating an example RF module of a wireless communication device to which methods as proposed herein are applicable.

Specifically, FIG. 21 illustrates an example RF module that may be implemented in a frequency division duplex (FDD) system.

First, in a transmission path, the processor described above in connection with FIGS. 19 and 20 processes data to be transmitted and provides an analog output signal to a transmitter 2110.

In the transmitter 2110, the analog output signal is filtered by a low pass filter (LPF) 2111 for removing images caused by digital-to-analog conversion (ADC), up-converted from baseband to RF by an up-converter (e.g., Mixer) 2112, and amplified by a variable gain amplifier (VGA) 2113. The amplified signal is filtered by a filter 2114, further amplified by a power amplifier (PA) 2115, routed via duplexer(s) 2150/antenna switch(es) 2160, and transmitted via an antenna 2170.

In a reception path, the antenna receives signals from the outside and provides the received signals. The signals are routed via the antenna switch(es) 2160/duplexers 2150 and are provided to a receiver 2120.

In the receiver 2120, the received signals are amplified by a low noise amplifier (LNA) 2123, filtered by a band pass filter 2124, and down-converted from RF to baseband by a down-converter (e.g., a mixer) 2125.

The down-converted signals are filtered by a low pass filter (LPF) 2126 and amplified by a VGA 2127 so that an analog input signal is obtained. The obtained analog input signal is provided to the processor described above in connection with FIGS. 19 and 20.

A local oscillator (LO) generator 2140 generates transmission and reception LO signals and provides them to the up-converter 2112 and the down-converter 2125, respectively.

A phase locked loop (PLL) 2130 receives control signals from the processor to generate transmission and reception LO signals at proper frequencies and provide the control signals to the LO generator 2140.

The circuits shown in FIG. 21 may have a different arrangement than that shown in FIG. 21.

Figure 22:
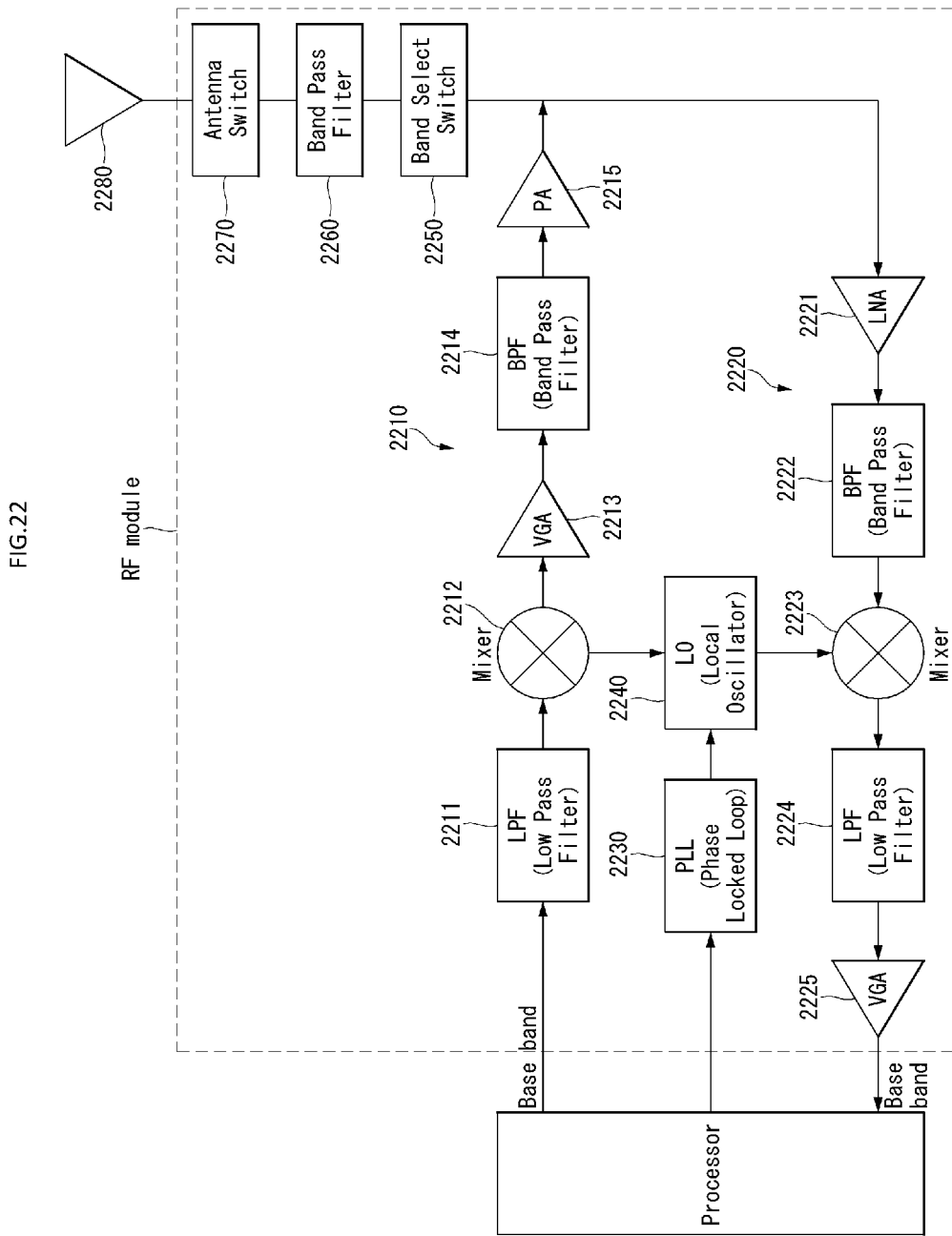
FIG. 22 is a view illustrating another example RF module of a wireless communication device to which methods as proposed herein are applicable.

FIG. 22 is a view illustrating another example RF module of a wireless communication device to which methods as proposed herein are applicable.

Specifically, FIG. 22 illustrates an example RF module that may be implemented in a time division duplex (TDD) system.

In the TDD system, the transceiver 2210 and receiver 2220 of the RF module are identical in structure to the transceiver and receiver of the RF module in the FDD system.

The following description of the RF module of the TDD system focuses primarily on differences from the RF module of the FDD system, and the description in connection with FIG. 17 may apply to the same structure.

The signal amplified by the power amplifier (PA) 2215 of the transmitter is routed via the band select switch 2250, the band pass filter (BPF) 2260, and antenna switch(es) 2270 and is transmitted via the antenna 2280.

In a reception path, the antenna receives signals from the outside and provides the received signals. The signals are routed via the antenna switch(es) 2270, band pass filter 2260, and band select switch 2250 and are provided to the receiver 2220.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

Although the scheme of transmitting/receiving sounding reference signals in the wireless communication system according to the disclosure has been described in connection with examples in which it applies to 5G systems (new RAT systems), the scheme is also applicable to other various wireless communication systems.

The invention claimed is:

1. A method performed by a user equipment (UE) operating in a wireless communication system, the method comprising:
  receiving, from a base station (BS), configuration information for at least one SRS resource set, wherein each of the at least one SRS resource set includes one or more SRS resources; and
  transmitting, to the BS, an SRS based on each SRS resource of the at least one SRS resource set,
  wherein based on i) an SRS resource set among the at least one SRS resource set being configured to be used for antenna switching and ii) SRS resources of the SRS resource set being configured in a same slot, a guard period is configured in-between the SRS resources of the SRS resource set,
  wherein based on i) the SRS resource set being configured to be used for the antenna switching and ii) the guard period being configured and iii) the guard period overlapping with at least one physical uplink control channel (PUCCH) symbol which is configured for a PUCCH:
  during the guard period, the UE uses a priority rule between the PUCCH and the guard period which is same as a priority rule between the PUCCH and the SRS.

2. The method of claim 1, wherein the configuration information further includes information regarding a usage of the at least one SRS resource set.

3. The method of claim 1, wherein the PUCCH is for a channel state information (CSI) reporting or a beam failure recovery.

4. The method of claim 3, wherein, based on the PUCCH being configured for the beam failure recovery, a guard period and an SRS resource that are overlapped with the PUCCH are dropped.

5. The method of claim 1, wherein a number of symbols of the guard period is configured based on a subcarrier spacing which is configured for the transmission of the SRS.

6. The method of claim 5, wherein the number of symbols of the guard period is one or two.

7. The method of claim 1, wherein the priority rule between the PUCCH and the SRS is configured such that:
  (i) for aperiodic SRS overlapping in time with the PUCCH carrying only semi-persistent CSI reports, the UE does not transmit the PUCCH,
  (ii) for aperiodic SRS overlapping in time with the PUCCH carrying only periodic CSI reports, the UE does not transmit the PUCCH,
  (iii) for semi-persistent SRS overlapping in time with the PUCCH carrying only CSI reports, the UE does not transmit the semi-persistent SRS, and
  (iv) for periodic SRS overlapping in time with the PUCCH carrying only CSI reports, the UE does not transmit the periodic SRS.

8. The method of claim 7, wherein the priority rule between the PUCCH and the guard period is identically configured to the priority rule between the PUCCH and the SRS such that:
  (i) for the guard period configured in-between SRS resources for aperiodic SRS overlapping in time with the PUCCH carrying only semi-persistent CSI reports, the UE does not transmit the PUCCH, and
  (ii) for the guard period configured in-between SRS resources for aperiodic SRS overlapping in time with the PUCCH carrying only periodic CSI reports, the UE does not transmit the PUCCH.

9. The method of claim 1, wherein, based on the usage of the at least one SRS resource set being set to the antenna switching, each SRS resource of the at least one SRS resource set is related to a different antenna of the UE for the transmission of the SRS.

10. A user equipment (UE) configured to operate in a wireless communication system, the UE comprising:
  a radio frequency (RF) unit;
  at least one processor; and
  at least one computer memory operably connected to the at least one processor and storing instructions that, based on being executed by the at least one processor, perform operations comprising:
    receiving, from a base station (BS), configuration information for at least one SRS resource set, wherein each of the at least one SRS resource set includes one or more SRS resources; and
    transmitting, to the BS, an SRS based on each SRS resource of the at least one SRS resource set,
    wherein based on i) an SRS resource set among the at least one SRS resource set being configured to be used for antenna switching and ii) SRS resources of the SRS resource set being configured in a same slot, a guard period is configured in-between the SRS resources of the SRS resource set,
    wherein based on i) the SRS resource set being configured to be used for the antenna switching and ii) the guard period being configured and iii) the guard period overlapping with at least one physical uplink control channel (PUCCH) symbol which is configured for a PUCCH:
      during the guard period, the UE uses a priority rule between the PUCCH and the guard period which is same as a priority rule between the PUCCH and the SRS.

11. The UE of claim 10, wherein the configuration information further includes information regarding a usage of the at least one SRS resource set.

12. The UE of claim 10, wherein the PUCCH is for a channel state information (CSI) reporting or a beam failure recovery.

13. The UE of claim 10, wherein a number of symbols of the guard period is configured based on a subcarrier spacing which is configured for the transmission of the SRS.

14. The UE of claim 10, wherein the priority rule between the PUCCH and the SRS is configured such that:
  (i) for aperiodic SRS overlapping in time with the PUCCH carrying only semi-persistent CSI reports, the UE does not transmit the PUCCH,
  (ii) for aperiodic SRS overlapping in time with the PUCCH carrying only periodic CSI reports, the UE does not transmit the PUCCH,
  (iii) for semi-persistent SRS overlapping in time with the PUCCH carrying only CSI reports, the UE does not transmit the semi-persistent SRS, and
  (iv) for periodic SRS overlapping in time with the PUCCH carrying only CSI reports, the UE does not transmit the periodic SRS.

15. The UE of claim 14, wherein the priority rule between the PUCCH and the guard period is identically configured to the priority rule between the PUCCH and the SRS such that:
  (i) for the guard period configured in-between SRS resources for aperiodic SRS overlapping in time with the PUCCH carrying only semi-persistent CSI reports, the UE does not transmit the PUCCH, and
  (ii) for the guard period configured in-between SRS resources for aperiodic SRS overlapping in time with the PUCCH carrying only periodic CSI reports, the UE does not transmit the PUCCH.

16. A method performed by a base station (BS) operating in a wireless communication system, the method comprising:
  transmitting, to a user equipment (UE), configuration information for at least one SRS resource set, wherein each of the at least one SRS resource set includes one or more SRS resources; and
  receiving, from the UE, an SRS based on each SRS resource of the at least one SRS resource set,
  wherein based on i) an SRS resource set among the at least one SRS resource set being configured to be used for antenna switching and ii) SRS resources of the SRS resource set being configured in a same slot, a guard period is configured in-between the SRS resources of the ofthe SRS resource set,
  wherein based on i) the SRS resource set being configured to be used for the antenna switching and ii) the guard period being configured and iii) the guard period overlapping with at least one physical uplink control channel (PUCCH) symbol which is configured for a PUCCH:
during the guard period, a priority rule between the PUCCH and the guard period which is same as a priority rule between the PUCCH and the SRS is used by the UE.

17. The method of claim 16, wherein the priority rule between the PUCCH and the SRS is configured such that:
(i) for aperiodic SRS overlapping in time with the PUCCH carrying only semi-persistent CSI reports, the UE does not transmit the PUCCH,
(ii) for aperiodic SRS overlapping in time with the PUCCH carrying only periodic CSI reports, the UE does not transmit the PUCCH,
(iii) for semi-persistent SRS overlapping in time with the PUCCH carrying only CSI reports, the UE does not transmit the semi-persistent SRS, and
(iv) for periodic SRS overlapping in time with the PUCCH carrying only CSI reports, the UE does not transmit the periodic SRS.

18. The method of claim 17, wherein the priority rule between the PUCCH and the guard period is identically configured to the priority rule between the PUCCH and the SRS such that:
(i) for the guard period configured in-between SRS resources for aperiodic SRS overlapping in time with the PUCCH carrying only semi-persistent CSI reports, the UE does not transmit the PUCCH, and
(ii) for the guard period configured in-between SRS resources for aperiodic SRS overlapping in time with the PUCCH carrying only periodic CSI reports, the UE does not transmit the PUCCH.

19. A base station (BS) configured to operate in a wireless communication system, the BS comprising:
a radio frequency (RF) unit;
at least one processor; and
at least one computer memory operably connected to the at least one processor and storing instructions that, based on being executed by the at least one processor, perform operations comprising:
transmitting, to a user equipment (UE), configuration information for at least one SRS resource set, wherein each of the at least one SRS resource set includes one or more SRS resources; and
receiving, from the UE, an SRS based on each SRS resource of the at least one SRS resource set,
wherein based on i) an SRS resource set among the at least one SRS resource set being configured to be used for antenna switching and ii) SRS resources of the SRS resource set being configured in a same slot, a guard period is configured in-between the SRS resources of the SRS resource set,
wherein based on i) the SRS resource set being configured to be used for the antenna switching and ii) the guard period being configured and iii) the guard period overlapping with at least one physical uplink control channel (PUCCH) symbol which is configured for a PUCCH:
during the guard period, a priority rule between the PUCCH and the guard period which is same as a priority rule between the PUCCH and the SRS is used by the UE.

* * * * *

UNITED STATES PATENT AND TRADEMARK OFFICE
CERTIFICATE OF CORRECTION

| | | |
|---|---|---|
| PATENT NO. | : 11,770,226 B2 | |
| APPLICATION NO. | : 17/982016 | |
| DATED | : September 26, 2023 | |
| INVENTOR(S) | : Kukheon Choi et al. | |

It is certified that error appears in the above-identified patent and that said Letters Patent is hereby corrected as shown below:

On the Title Page

In Item (72), Column 1, Line 1, after "Seoul (KR);" delete "Kunii" and insert -- Kunil --, therefor.

Signed and Sealed this
Fourth Day of June, 2024

Katherine Kelly Vidal
*Director of the United States Patent and Trademark Office*